United States Patent
Russell et al.

(10) Patent No.: US 12,004,046 B2
(45) Date of Patent: Jun. 4, 2024

(54) OBJECT TRACKING BASED ON UWB TAGS

(71) Applicant: Motorola Mobility LLC, Chicago, IL (US)

(72) Inventors: Michael E. Russell, Lake Zurich, IL (US); Jarrett K. Simerson, Northbrook, IL (US); Thomas Yates Merrell, St Charles, IL (US)

(73) Assignee: Motorola Mobility LLC, Chicago, IL (US)

( * ) Notice: Subject to any disclaimer, the term of this patent is extended or adjusted under 35 U.S.C. 154(b) by 95 days.

(21) Appl. No.: 17/473,671

(22) Filed: Sep. 13, 2021

(65) Prior Publication Data

US 2023/0078485 A1 Mar. 16, 2023

(51) Int. Cl.
G01S 5/02 (2010.01)
G01S 19/42 (2010.01)
H04W 4/02 (2018.01)
H04W 4/029 (2018.01)

(52) U.S. Cl.
CPC ......... H04W 4/029 (2018.02); G01S 5/02524 (2020.05); G01S 19/42 (2013.01)

(58) Field of Classification Search
CPC ..... G01S 5/02524; G01S 19/42; H04W 4/029
USPC .................................... 342/357.25
See application file for complete search history.

(56) References Cited

U.S. PATENT DOCUMENTS

| | | | |
|---|---|---|---|
| 6,677,895 B1 | 1/2004 | Holt | |
| 7,976,386 B2 | 7/2011 | Tran | |
| 8,483,853 B1 | 7/2013 | Lambourne | |
| 9,244,525 B2 | 1/2016 | Crawford et al. | |

(Continued)

FOREIGN PATENT DOCUMENTS

| CN | 107907857 A | 4/2018 |
|---|---|---|
| CN | 107991647 A | 5/2018 |

(Continued)

OTHER PUBLICATIONS

"[Update] Introducing the New Galaxy SmartTag+: The Smart Way to Find Lost Items", Samsung US Newsroom [online][retrieved Jun. 29, 2021]. Retrieved from the Internet <https://news.samsung.com/us/introducing-the-new-galaxy-smarttag-plus/>., May 11, 2021, 8 Pages.

(Continued)

*Primary Examiner* — Harry K Liu
(74) *Attorney, Agent, or Firm* — FIG. 1 Patents

(57) ABSTRACT

In aspects of object tracking based on UWB tags, a system includes ultra-wideband (UWB) tags located for association with respective objects in an environment, where each UWB tag is identified with a digital label indicative of the association with one or more of the objects. A tracking service is implemented to receive initial location data for the objects from each of the UWB tags that are associated with the objects, and generate an object identity database in which each of the objects are identified by their respective initial location data. The tracking service can monitor for movement of an object that is identified by the initial location data based on subsequent positioning data associated with the object. The movement of an object is monitored for an unauthorized relocation of the object, for a cluster of multiple objects moving together, and/or for an abnormal proximity of multiple objects in the environment.

20 Claims, 9 Drawing Sheets

(56) References Cited

U.S. PATENT DOCUMENTS

| | | | |
|---|---|---|---|
| 10,158,536 B2 | 12/2018 | Kim et al. | |
| 10,277,981 B1 | 4/2019 | Frank | |
| 10,484,832 B1 | 11/2019 | Tyagi et al. | |
| 10,499,194 B1 | 12/2019 | Tyagi et al. | |
| 10,554,439 B2 | 2/2020 | Plummer et al. | |
| 10,869,166 B2 | 12/2020 | Tyagi et al. | |
| 11,051,260 B2 | 6/2021 | Gorsica et al. | |
| 11,543,530 B1 | 1/2023 | Liu et al. | |
| 2007/0254626 A1 | 11/2007 | Ahlgren | |
| 2012/0027194 A1 | 2/2012 | Deshpande et al. | |
| 2013/0310055 A1 | 11/2013 | Dewing et al. | |
| 2014/0057675 A1 | 2/2014 | Meyers et al. | |
| 2014/0073252 A1 | 3/2014 | Lee et al. | |
| 2015/0193036 A1 | 7/2015 | Yoo et al. | |
| 2017/0013406 A1 | 1/2017 | Oliver et al. | |
| 2017/0039783 A1 | 2/2017 | Hobel | |
| 2017/0289951 A1* | 10/2017 | Dey | H04W 64/006 |
| 2018/0045807 A1 | 2/2018 | Senna et al. | |
| 2018/0107446 A1 | 4/2018 | Wilberding et al. | |
| 2018/0302869 A1 | 10/2018 | Hollar | |
| 2019/0132839 A1 | 5/2019 | Li et al. | |
| 2019/0182734 A1 | 6/2019 | Laliberte | |
| 2019/0208270 A1 | 7/2019 | Bates et al. | |
| 2019/0340396 A1* | 11/2019 | Mills | G06Q 50/28 |
| 2020/0037112 A1 | 1/2020 | Tyagi et al. | |
| 2020/0228943 A1 | 7/2020 | Martin et al. | |
| 2020/0401365 A1 | 12/2020 | Wilberding et al. | |
| 2021/0064043 A1 | 3/2021 | Kulkarni et al. | |
| 2021/0088456 A1 | 3/2021 | Asayama et al. | |
| 2021/0092563 A1 | 3/2021 | Hollar et al. | |
| 2021/0190940 A1 | 6/2021 | Troutman | |
| 2021/0224492 A1 | 7/2021 | Eisendle et al. | |
| 2021/0241551 A1 | 8/2021 | Loeshelle | |
| 2021/0304577 A1 | 9/2021 | Hollar et al. | |
| 2021/0320681 A1 | 10/2021 | Baek et al. | |
| 2021/0383624 A1 | 12/2021 | Hoyer et al. | |
| 2022/0095120 A1 | 3/2022 | Panje et al. | |
| 2022/0201427 A1 | 6/2022 | Rechenberger | |
| 2022/0244367 A1 | 8/2022 | Shin et al. | |
| 2022/0283321 A1 | 9/2022 | Ng et al. | |
| 2022/0394347 A1 | 12/2022 | Cheong et al. | |
| 2022/0394660 A1 | 12/2022 | Werner et al. | |
| 2023/0075389 A1 | 3/2023 | Wu et al. | |
| 2023/0079580 A1 | 3/2023 | Russell et al. | |
| 2023/0168343 A1 | 6/2023 | Russell et al. | |
| 2023/0169839 A1 | 6/2023 | Russell et al. | |
| 2023/0171298 A1 | 6/2023 | Russell et al. | |
| 2023/0184561 A1 | 6/2023 | Salter et al. | |
| 2023/0195411 A1 | 6/2023 | Lewis et al. | |
| 2023/0217210 A1 | 7/2023 | Russell et al. | |
| 2023/0217215 A1 | 7/2023 | Russell et al. | |
| 2023/0231591 A1 | 7/2023 | Russell et al. | |
| 2024/0031932 A1 | 1/2024 | Zhang | |

FOREIGN PATENT DOCUMENTS

| | | | | |
|---|---|---|---|---|
| CN | 108650623 A | | 10/2018 | |
| CN | 109725338 A | * | 5/2019 | |
| CN | 109754553 A | * | 5/2019 | |
| CN | 112911505 A | | 6/2021 | |
| CN | 113115208 A | * | 7/2021 | |
| CN | 111103611 B | * | 9/2021 | G01C 21/206 |
| CN | 113453147 A | | 9/2021 | |
| CN | 217643343 U | | 10/2022 | |
| EP | 3680687 A1 | * | 7/2020 | G01S 1/0428 |
| KR | 102104088 B1 | | 4/2020 | |
| KR | 102328673 | | 11/2021 | |
| WO | 2019221800 A1 | | 11/2019 | |

OTHER PUBLICATIONS

"Car Connectivity Consortium", Car Connectivity Consortium [retrieved Jun. 28, 2021]. Retrieved from the Internet <https://carconnectivity.org/>., Feb. 22, 2018, 6 Pages.

"FiRa Consortium, Inc.", FiRa Consortium, Inc. [retrieved Jun. 28, 2021]. Retrieved from the Internet <https://www.firaconsortium.org/>., Aug. 1, 2019, 3 Pages.

"Tile Bluetooth Tracking Device", Tile Inc. [retrieved Jun. 28, 2021]. Retrieved from the Internet <https://www.thetileapp.com/en-us/how-it-works>., 2012, 18 Pages.

Haselton, Todd, "Here's how Apple's AirTag trackers compare to Tile, and why the company is so upset with Apple", CNBC [online][retrieved Jun. 29, 2021]. Retrieved from the Internet <https://www.cnbc.com/2021/04/27/apple-airtags-versus-tile-tracker-how-they-compare.html>., Apr. 27, 2021, 8 Pages.

Pirch, Hans-Juergen et al., "Introduction to Impulse Radio UWB Seamless Access Systems", FiRa Consortium [retrieved Jun. 28, 2021]. Retrieved from the Internet <https://www.firaconsortium.org/sites/default/files/2020-04/fira-introduction-impulse-radio-uwb-wp-en.pdf>., Feb. 2020, 15 Pages.

"IEEE Standard for Low-Rate Wireless Networks—Amendment 1: Enhanced Ultra Wideband (UWB) Physical Layers (PHYs) and Associated Ranging Techniques", IEEE 802.15.4z-2020 [retrieved Nov. 16, 2022]. Retrieved from the Internet <10.1109/IEEESTD.2020.9179124>., Aug. 25, 2020, 174 Pages.

"Proximity Profile (PXP)", Bluetooth SIG, Inc. [retrieved Nov. 18, 2022]. Retrieved from the Internet <https://www.bluetooth.com/specifications/specs/proximity-profile-1-0-1/>., Jan. 25, 2022, 11 Pages.

"Proximity Profile 1.0.1", Bluetooth SIG, Inc. [retrieved Nov. 18, 2022]. Retrieved from the Internet <https://www.bluetooth.com/specifications/specs/proximity-profile-1-0-1/>., Jul. 14, 2015, 20 Pages.

"Test Suite (TS)", Bluetooth SIG, Inc. [retrieved Nov. 18, 2022]. Retrieved from the Internet <https://www.bluetooth.com/specifications/specs/proximity-profile-1-0-1/>., Jul. 29, 2019, 23 Pages.

U.S. Appl. No. 17/536,636, "Non-Final Office Action", U.S. Appl. No. 17/536,636, dated Mar. 3, 2023, 12 pages.

U.S. Appl. No. 17/579,933, "Non-Final Office Action", U.S. Appl. No. 17/579,933, dated Mar. 16, 2023, 8 pages.

Davis, Giles T, et al., "US Application as Filed", U.S. Appl. No. 17/708,410, filed Mar. 30, 2022, 61 pages.

GB2213053.8, "Combined Search and Examination Report", GB Application No. GB2213053.8, dated Feb. 23, 2023, 10 pages.

Russell, Michael E, et al., "US Application as Filed", U.S. Appl. No. 18/097,611, filed Jan. 17, 2023, 71 pages.

Russell, Michael E, et al., "US Application as Filed", U.S. Appl. No. 17/473,477, filed Sep. 13, 2021, 61 pages.

U.S. Appl. No. 17/536,535, "Non-Final Office Action", U.S. Appl. No. 17/536,535, dated Apr. 18, 2023, 20 pages.

Cheong, Minho, et al., "US Provisional Application as Filed", U.S. Appl. No. 63/197,867, filed Jun. 7, 2021, 68 pages.

GB2213121.3, "Search Report", GB Application No. GB2213121.3, dated Mar. 9, 2023, 5 pages.

GB2216213.5, "Combined Search and Examination Report", GB Application No. GB2216213.5, dated Apr. 28, 2023, 10 pages.

U.S. Appl. No. 17/536,535, "Final Office Action", U.S. Appl. No. 17/536,535, dated Aug. 11, 2023, 25 pages.

U.S. Appl. No. 17/536,636, "Non-Final Office Action", U.S. Appl. No. 17/536,636, dated Jul. 13, 2023, 14 pages.

U.S. Appl. No. 17/579,933, "Final Office Action", U.S. Appl. No. 17/579,933, dated Jun. 12, 2023, 10 pages.

U.S. Appl. No. 63/261,929, "Provisional Application", U.S. Appl. No. 63/261,929, filed Sep. 30, 2021, 62 pages.

U.S. Appl. No. 17/473,477, "Non-Final Office Action", U.S. Appl. No. 17/473,477, dated Sep. 14, 2023, 12 pages.

U.S. Appl. No. 17/566,530, "Non-Final Office Action", U.S. Appl. No. 17/566,530, dated Nov. 9, 2023, 14 pages.

U.S. Appl. No. 17/473,477, "Advisory Action", U.S. Appl. No. 17/473,477, Feb. 12, 2024, 3 pages.

U.S. Appl. No. 17/473,477, "Final Office Action", U.S. Appl. No. 17/473,477, Dec. 29, 2023, 5 pages.

U.S. Appl. No. 17/536,535, "Non-Final Office Action", U.S. Appl. No. 17/536,535, Dec. 29, 2023, 26 pages.

U.S. Appl. No. 17/536,636, "Corrected Notice of Allowability", U.S. Appl. No. 17/536,636, Jan. 19, 2024, 3 pages.

(56) References Cited

OTHER PUBLICATIONS

U.S. Appl. No. 17/536,636, "Corrected Notice of Allowability", U.S. Appl. No. 17/536,636, Feb. 5, 2024, 3 pages.
U.S. Appl. No. 17/536,636, "Notice of Allowance", U.S. Appl. No. 17/536,636, Jan. 10, 2024, 9 pages.
U.S. Appl. No. 17/566,530, "Final Office Action", U.S. Appl. No. 17/566,530, Feb. 16, 2024, 16 pages.
U.S. Appl. No. 17/579,933, "Non-Final Office Action", U.S. Appl. No. 17/579,933, Dec. 19, 2023, 11 pages.
U.S. Appl. No. 17/473,477, "Non-Final Office Action", U.S. Appl. No. 17/473,477, Apr. 8, 2024, 6 pages.
U.S. Appl. No. 17/536,499, "Non-Final Office Action", U.S. Appl. No. 17/536,499, Mar. 22, 2024, 13 pages.
U.S. Appl. No. 17/536,535, "Notice of Allowance", U.S. Appl. No. 17/536,535, Apr. 10, 2024, 7 pages.
U.S. Appl. No. 17/579,933, "Corrected Notice of Allowability", U.S. Appl. No. 17/579,933, Apr. 10, 2024, 3 pages.
U.S. Appl. No. 17/579,933, "Notice of Allowance", U.S. Appl. No. 17/579,933, Mar. 29, 2024, 6 pages.

* cited by examiner

OBJECT TRACKING BASED ON UWB TAGS

BACKGROUND

Ultra-wideband (UWB) is a radio technology that can be utilized for secure, spatial location applications using very low energy for short-range, high-bandwidth communications. The technology is detailed by the IEEE 802.15.4z standard for Enhanced Ultra-Wideband (UWB) Physical Layers (PHYs) and Associated Ranging Techniques for accurate relative position tracking, which provides for applications using relative distance between entities. Notably, UWB utilizes double-sided, two-way ranging between devices and provides for highly precise positioning, within 10 cm of ranging accuracy in as little as three degrees of precision through time-of-flight (ToF) and angle-of-arrival (AoA) measurements at up to 100 m through the use of impulse radio communications in the 6-10 GHz frequency range. The positioning is an accurate and secure technology using the scrambled timestamp sequence (STS), cryptographically secure pseudo-random number generation, and other features of the UWB PHY.

BRIEF DESCRIPTION OF THE DRAWINGS

Implementations of the techniques for object tracking based on UWB tags are described with reference to the following Figures. The same numbers may be used throughout to reference like features and components shown in the Figures.

DETAILED DESCRIPTION

Figure 1:
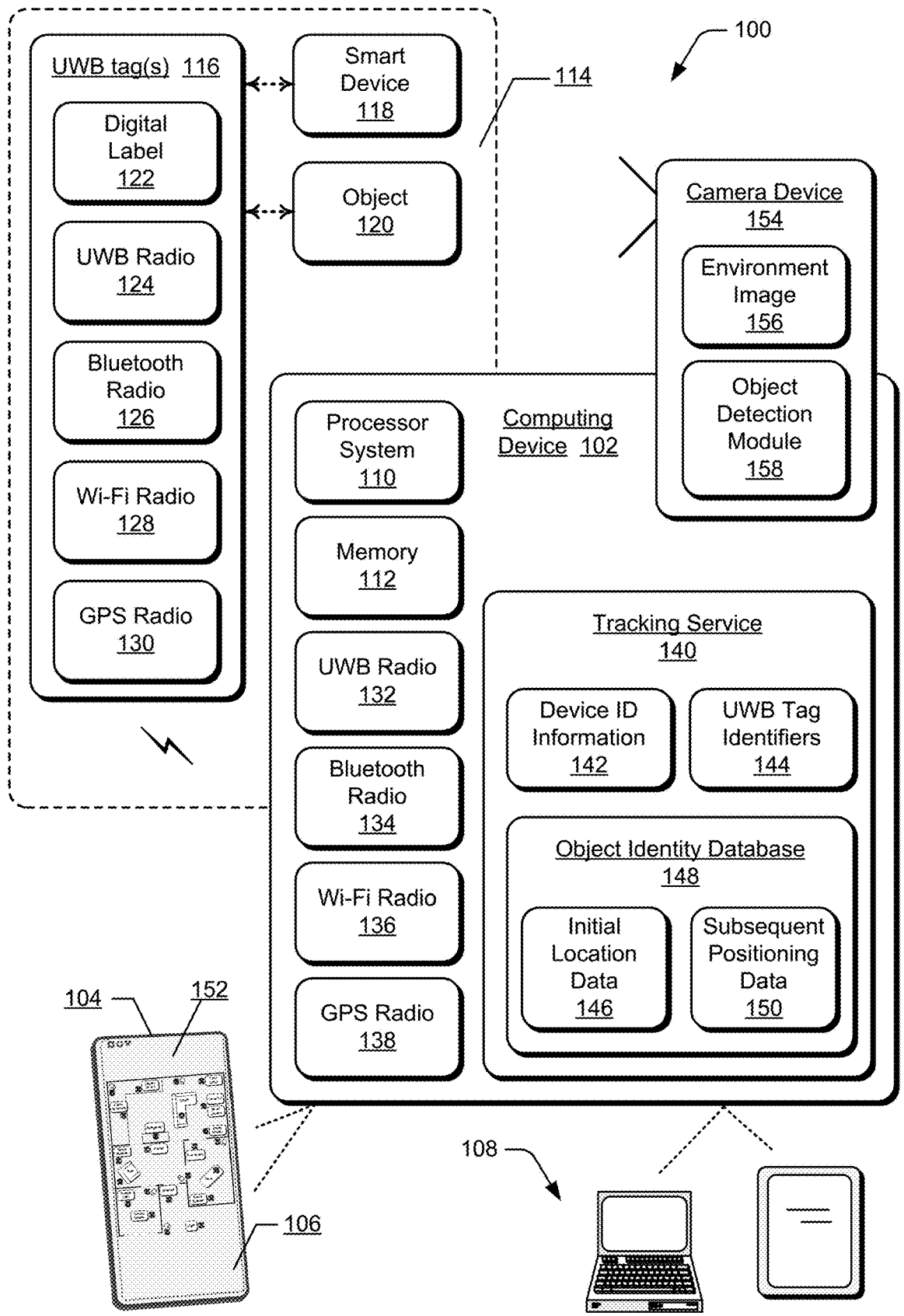
FIG. 1 illustrates example devices and features for object tracking based on UWB tags in accordance with one or more implementations as described herein.

Implementations of techniques for object tracking based on ultra-wideband (UWB) tags are described, and provide techniques that can be implemented by any type of computing devices, such as smart devices, mobile devices (e.g., cellular phones, tablet devices, smartphones, wireless devices), consumer electronics, smart home automation devices, and the like. Generally, UWB-enabled smart devices, such as smartphones and home automation devices, can be used to determine spatial awareness that provides features implemented in smart homes and buildings with access control, security, location-based services, and peer-to-peer applications.

In aspects of the techniques for object tracking based on UWB tags, a system includes UWB tags located for association with respective objects in an environment, where each UWB tag is identified with a digital label indicative of the association with one or more of the objects. As described herein, an object in an environment may be any type of a smart device, mobile device, electronic device, or a non-communicative, static object or device. The system also includes a tracking service, such as implemented by a computing device in the environment, and the tracking service can monitor and determine movements of the objects (e.g., to include smart devices) based on positioning system data, such as global positioning system (GPS) data or any other type of geo-location positioning data.

The tracking service can monitor the movements of the objects for a security determination as to an unauthorized relocation of one or more of the objects. For example, the tracking service can monitor the movements of the objects for a cluster of multiple objects moving together in an unauthorized manner, and/or for an abnormal proximity of multiple objects in the environment. Generally, devices such as a mobile phone or laptop computer will likely be moved around in an environment, as well as in and out of the environment, by the user of the devices. However, other types of devices, such as a smart TV and sound system components, generally remain static in the environment. If the tracking service determines that many or all of the devices are moving and being abnormally clustered together, this may indicate a malicious event, such as a robbery.

In aspects of object tracking based on UWB tags, the tracking service implemented by a computing device can receive initial location data for the objects from each of the UWB tags that are associated with the respective objects. In implementations, the tracking service receives the initial location data for the objects as any type of positioning system data, such as GPS data. An object that is a smart device and GPS-enabled can also communicate its own GPS data to an associated UWB tag, which can then communicate the GPS data to the computing device that implements the tracking service.

The tracking service can generate an object identity database in which each of the objects are identified by their respective initial location data. Notably, the objects and smart devices are each identified in the object identity database by only the initial location data, without additional device identifying information. Additionally, the initial location data that identifies the objects and smart devices in the object identity database can be communicated to a cloud-based network system for object tracking, without exposing any other device identifying information of the objects and smart devices.

As noted above, the tracking service can monitor for movement of an object that is identified by the initial location data based on subsequent positioning data associated with the object. The tracking service can receive the subsequent positioning data associated with the object as updated GPS data, and determine movements of the object based on the updated GPS data. Further, the tracking service can determine updated location data associated with the object based on the subsequent positioning data, and update the identity of the object in the object identity database using the updated location data.

In other aspects of object tracking, environment mapping can be utilized to provide for automating the distribution, identification, and placement of the UWB tags in the environment, such as in a smart home or other type of building environment. The described techniques utilize UWB ranging data, such as time-of-flight (ToF), angle-of-arrival (AoA), and/or time-difference-of-arrival (TDoA), as well as Wi-Fi and/or Bluetooth RSSI measurements, and optionally camera imaging, to determine UWB tag locations in the environment, generate a floor plan, and provide semantic names for detected devices and objects. The UWB precise location positioning capabilities is utilized to enable location detection of UWB tags at particular locations in the environment, which can then be used to enhance the wireless and digital experience in a smart home environment by utilizing the precise and secure location positioning features.

While features and concepts of the described techniques for object tracking based on UWB tags can be implemented in any number of different devices, systems, environments, and/or configurations, implementations of the techniques for object tracking based on UWB tags are described in the context of the following example devices, systems, and methods.

FIG. 1 illustrates an example system 100 for object tracking based on UWB tags, as described herein. Generally, the system 100 includes a computing device 102, which can be utilized to implement features and techniques of the object tracking. In this example system 100, the computing device 102 may be a wireless device 104 with a display screen 106, such as a smartphone or mobile phone. Alternatively or in addition, the system 100 can include the computing device 102 as any type of an electronic, computing, and/or communication device 108, such as a computer, a laptop device, a desktop computer, a tablet, a wireless device, a camera device, a smart device, a smart display, a smart TV, a smart appliance, a home automation device, and so forth. The computing device 102 can be implemented with various components, such as a processor system 110 and memory 112, as well as any number and combination of different components as further described with reference to the example device shown in FIG. 9. For example, the wireless device 104 can include a power source to power the device, such as a rechargeable battery and/or any other type of active or passive power source that may be implemented in an electronic, computing, and/or communication device.

In implementations, the wireless device 104 may be communicatively linked, generally by wireless connection, to UWB tags and/or to other devices embedded with UWB in an environment 114. Generally, the environment 114 can include the computing device 102, the wireless device 104, smart devices, the UWB tags 116, and devices implemented for communication utilizing UWB, as well as any number of the other types of electronic, computing, and/or communication devices 108 described herein. The wireless UWB communications in the environment 114 are similar between the UWB tags and/or UWB-embedded devices in the environment. The UWB tags can be placed in the environment proximate each of the objects and/or smart devices and then labeled with a functional name to indicate a UWB tag association with a particular object and/or smart device. Given the angular precision and centimeter accurate ranging that UWB provides, location detection of UWB tags at particular locations in the environment can be used to enhance the wireless and digital experience in a smart home environment.

In this example system 100, smart devices may include an embedded UWB radio, and a UWB tag 116 may be associated with a smart device 118 in the environment 114. Similarly, a UWB tag 116 may be associated with any type of object 120 in the environment, such as any type of a smart device, mobile device, electronic device, or a non-communicative, static object or device. For example, the UWB tags 116 can be positioned and located in the environment 114 for association with respective smart devices and/or objects, and each UWB tag can be identified with a digital label 122 indicative of the association with one or more of the objects and/or smart devices in the environment. For example, the object 120 may be a smart TV in a home environment, and the digital label 122 of the UWB tag 116 indicates "smart TV" as the identifier of the UWB tag association. Similarly, the object 120 may be a floor lamp in the home environment, and the digital label 122 of the UWB tag 116 indicates "floor lamp" as the identifier of the UWB tag association.

In some instances, smart devices and/or objects in the environment 114 may already be UWB-enabled for wireless communication with the other devices and the UWB tags 116 in the environment. The wireless UWB communications for mapping objects and/or devices in the environment 114 are similar between the UWB tags 116 and/or UWB-embedded smart devices in the environment. A network of the UWB tags 116 in the environment 114 can discover and communicate between themselves and/or with a control device or controller logic that manages the smart devices and UWB tags in the environment.

In implementations, a UWB tag 116 can be used at a fixed location to facilitate accurate location and positioning of inanimate objects and/or areas in the environment 114, such as positioning the UWB tag on a blank wall in a home environment. Generally, the object 120 associated with the UWB tag 116 would then be the portion of the blank wall proximate the UWB tag. Given the known location of the blank wall in the home environment, a user may then overlay augmented reality (AR) information on the blank wall and interact with the digital world that is anchored by the UWB tag 116, even though the wall is inherently not an electronic device. Similarly, the UWB tags 116 in the environment 114 can allow for an AR-guided user experience, such as to locate a missing item or other misplaced device. For example, if a user loses or misplaces a smartphone or smart watch, the precision of location detection provided by the system of UWB tags 116 can guide a user to the location of the missing item in the environment.

The UWB protocol is designed to utilize out-of-band communications that use low-power, wireless protocols for UWB device discovery and UWB session configuration, such as via Bluetooth or Bluetooth Low Energy (BLE), which uses less power than if a UWB radio was used alone. Additionally, using BLE for UWB out-of-band communications provides for a large network effect given the number of devices that are already BLE-enabled. Because BLE is able to receive and decode advertising packets, the UWB tags 116 placed in the environment 114 proximate a smart device, for example, can determine the nearest Bluetooth MAC ADDR and likely an indication of the device name of the nearby smart device. When the nearest device name is not advertised, the UWB tag can check against the BD ADDR that is already known on the computing device 102, which is also particularly useful if privacy settings are enabled and an identity resolving key is not available on the UWB Tag.

Alternatively or in addition to a UWB tag 116 receiving address and device identifying information from nearby smart devices, and then identifying the smart device 118 that is located nearest to the UWB tag, the computing device 102 can communicate with the UWB tags 116 and the smart devices in the environment, and receive Bluetooth or BLE advertised communications from the UWB tags and smart devices. The computing device 102 may be a centralized controller and/or mobile device in the environment that correlates a UWB tag 116 with a nearby smart device 118 based on RSSI measurements of the Bluetooth or BLE advertised communications from the UWB tags and smart devices. For example, the computing device 102 can receive advertised signals from a UWB tag 116 and a smart device 118, and compare the signal path loss from the received signals to determine that the UWB tag and smart device are proximate each other in the environment 114 based on similar signal path loss.

In aspects of the described features for object tracking based on UWB tags, user interaction can be minimized or eliminated as the UWB tags are implemented to automate identification and labeling, such as by using Bluetooth or BLE communications and/or captured images. For example, when a UWB tag 116 is located for association with the smart device 118 in the environment 114, the UWB tag can determine an identity of the smart device based on a Bluetooth MAC ADDR and/or other device identifying information communicated from the smart device. Additionally, the UWB tag 116 can utilize received Wi-Fi or Bluetooth RSSI measurements in conjunction with the UWB positioning information to generate and sort a list of nearby smart devices, and select the MAC ADDR of the smart device closest to the UWB tag. Further, in an environment that includes the computing device 102, such as a mobile phone, smartphone, or other wireless device that has a network association with the smart device 118, the UWB tag 116 that is located for association with the smart device 118 in the environment can receive an identity of the smart device from the computing device.

In this example system 100, a UWB tag 116 is generally representative of any UWB tag or device with embedded UWB in the environment 114, and can include various radios for wireless communications with other devices and/or with the other UWB tags in the environment. For example, the UWB tag 116 can include a UWB radio 124, a Bluetooth radio 126, a Wi-Fi radio 128, and/or a global positioning system (GPS) radio 130 implemented for wireless communications with other devices and the UWB tags in the environment 114. The computing device 102 also includes various radios for wireless communication with the other devices and/or with the UWB tags 116 in the environment. For example, the computing device 102 includes a UWB radio 132, a Bluetooth radio 134, a Wi-Fi radio 136, and a GPS radio 138 implemented for wireless communications with other devices and with the UWB tags 116 in the environment 114.

In implementations, the computing device 102 and/or the UWB tags 116 may include any type of positioning system, such as a GPS transceiver or other type of geo-location device, to determine the geographical location of a UWB tag or the computing device. Notably, any of the devices described herein, to include components, services, computing devices, camera devices, and/or the UWB tags, can share the GPS data between any of the devices, whether they are GPS-hardware enabled or not. Although the resolution of global positioning is not as precise as the local positioning provided by UWB, the GPS data that is received by the GPS-enabled devices can be used for confirmation that the devices are all generally located in the environment 114, which is confirmed by the devices that are also UWB-enabled and included in the environment mapping. Other objects and devices, such as a smart TV, smart home appliance, lighting fixture, or other static, non-communicative objects, may not be GPS-hardware enabled, yet are included in the environment mapping based on the UWB tag associations with the respective objects and devices. The GPS location of these other objects and devices can be determined based on their relative position in the environment and their proximity to the GPS-enabled devices. Accordingly, changes in location of both GPS-enabled devices and non-GPS devices and objects can be tracked based on global positioning and local positioning in the environment.

The computing device 102 can also implement any number of device applications and/or modules, such as any type of a messaging application, communication application, media application, and/or any other of the many possible types of device applications or application modules. In this example system 100, the computing device 102 implements a tracking service 140, which may include independent processing, memory, and/or logic components functioning as a computing and/or electronic device integrated with the computing device 102. Alternatively or in addition, the tracking service 140 can be implemented in software, in hardware, or as a combination of software and hardware components. In this example, the tracking service 140 is implemented as a software application or module, such as executable software instructions (e.g., computer-executable instructions) that are executable with a processor (e.g., with the processor system 110) of the computing device 102 to implement the techniques and features for object tracking based on UWB tags, as described herein.

As a software application or module, the tracking service 140 can be stored on computer-readable storage memory (e.g., the memory 112 of the device), or in any other suitable memory device or electronic data storage implemented with the module. Alternatively or in addition, the tracking service 140 may be implemented in firmware and/or at least partially in computer hardware. For example, at least part of the module may be executable by a computer processor, and/or at least part of the module may be implemented in logic circuitry.

As described above, a UWB tag 116 that is located for association with the smart device 118 in the environment 114 can determine an identity of the smart device based on a Bluetooth MAC ADDR and/or other device identifying information communicated from the smart device. Generally, the UWB tags 116 can scan to receive device identifying information 142 communicated from nearby smart devices in the environment. The device identifying information 142 can be communicated via Bluetooth or BLE from the smart devices as a device name, a Bluetooth MAC ADDR, and a received signal strength indication (RSSI). The UWB tag 116 can identify the smart device 118 that is located nearest to the UWB tag based on the device identifying information 142 received from the smart devices, and generate an ordered list of the smart devices based on the device identifying information to identify the smart device that is located nearest to the UWB tag. Additionally, the tracking service 140 implemented by the computing device 102 can receive the device identifying information 142 communicated from the smart devices in the environment, as well as UWB tag identifiers 144 communicated from the UWB tags 116 in the environment.

In aspects of the described techniques for object tracking based on UWB tags, the tracking service 140 implemented by the computing device 102 can receive initial location data 146 for the smart devices and/or the objects from each of the UWB tags 116 that are associated with the smart devices and the objects. In implementations, the tracking service 140 receives the initial location data 146 for the smart devices and/or the objects as any type of positioning system data, such as GPS data via the GPS radio 138 of the computing device. An object that is a smart device 118 and GPS-enabled can communicate its own GPS data to an associated UWB tag 116, which can then communicate the GPS data to the computing device 102 via the GPS radio 130.

The tracking service 140 can generate an object identity database 148 in which each of the smart devices and/or objects are identified by their respective initial location data 146. Notably, the smart devices and/or the objects are each identified in the object identity database 148 by only the initial location data 146, without additional device identifying information. As further shown and described with reference to FIG. 6, the initial location data 146 that identifies the smart devices and/or the objects can be communicated to a cloud-based network system for object tracking, without exposing any other device identifying information of the smart devices and/or the objects.

The tracking service 140 can also monitor for movement of a smart device 118 and/or an object 120 that is identified by the initial location data 146 based on subsequent positioning data 150 associated with the device or object. The tracking service 140 implemented by the computing device 102 can receive the subsequent positioning data 150 associated with the smart device 118 and/or the object 120 as updated GPS data, and determine movements of the smart device or the object based on the updated GPS data. Further, the tracking service 140 can determine updated location data associated with a smart device 118 or an object 120 based on the subsequent positioning data 150, and update an identity of the device or the object in the object identity database 148 using the updated location data.

In aspects of the object tracking based on UWB tags, the tracking service 140 can monitor the movements of the smart devices and/or objects for a security determination as to an unauthorized relocation of a device or object. The tracking service 140 can also monitor the movements of the smart devices and/or the objects for a cluster of multiple devices or objects moving together in an unauthorized manner, and for an abnormal proximity of multiple objects in the environment. Generally, devices in the environment 114, such as a mobile phone or laptop computer, will likely be moved around the environment, as well as in and out of the environment, by the user of the devices. However, other types of devices, such as a smart TV and sound system components, generally remain static in the environment. If the tracking service 140 determines that many or all of the devices are moving and being abnormally clustered together, this may indicate a malicious event, such as a robbery.

As a device application, the tracking service 140 may have an associated application user interface 152 that is generated and displayed for user interaction and viewing, such as on the display screen 106 of the wireless device 104. Generally, an application user interface 152, or any other type of video, image, graphic, and the like is digital image content that is displayable on the display screen 106 of the wireless device 104. As part of a security system, the tracking service 140 can be implemented to initiate notifications based on determined, unauthorized movements and/or abnormal proximity of multiple smart devices and objects in the environment. For example, a notification may be displayed on the display screen 106 of the wireless device 104, and in a system that includes camera devices in the environment, the camera devices can be initiated to capture images of the environment in an effort to also capture an image of unauthorized persons in the area. The user of the wireless device 104 (e.g., a mobile phone) may also override any such warnings or notifications, such as if the user is moving furniture and the items in the environment.

Although the tracking service 140 is shown and described as being implemented by the computing device 102 in the environment 114, any of the other smart devices in the environment may implement the tracking service 140 and/or an instantiation of the tracking service. For example, the system 100 includes a camera device 154, which may be an independent electronic, computing, and/or communication device in the environment 114, and can implement the tracking service 140. Similarly, a control device or controller logic in the environment 114 can implement the tracking service, as well as a UWB tag 116 may implement the tracking service 140 in the environment.

In this example system 100, the camera device 154 may be implemented as a security camera, indoor environment camera, a doorbell camera, and the like. Generally, the camera device 154 may be implemented with any number and combination of the components described with reference to the computing device 102, where the camera device 154 can include an integrated UWB radio, as well as independent processing, memory, and/or logic components functioning as a computing and camera device. Alternatively, the camera device 154 may be implemented as a component of the computing device 102, such as in a mobile phone or other wireless device with one or more camera devices to facilitate image capture.

The camera device 154, such as any type of a security camera, indoor environment camera, a doorbell camera, or a camera device of the computing device 102, can be utilized to further implement the techniques for object tracking based on UWB tags. The camera device 154 can be used to capture an image 156 of the environment 114 (or a region of the environment), and the camera device implements an object detection module 158 utilized to identify the objects 120 and/or the smart devices 118 in the region of the environment from the captured image. Similar to the tracking service 140, the object detection module 158 may include independent processing, memory, and/or logic components functioning as a computing and/or electronic device integrated with the camera device 154 and/or with the computing device 102. Alternatively or in addition, the object detection module 158 can be implemented in software, in hardware, or as a combination of software and hardware components. In this example, the object detection module 158 is implemented as a software application or module, such as executable software instructions (e.g., computer-executable instructions) that are executable with a device processor and stored on computer-readable storage memory (e.g., on memory of the device).

Figure 2:
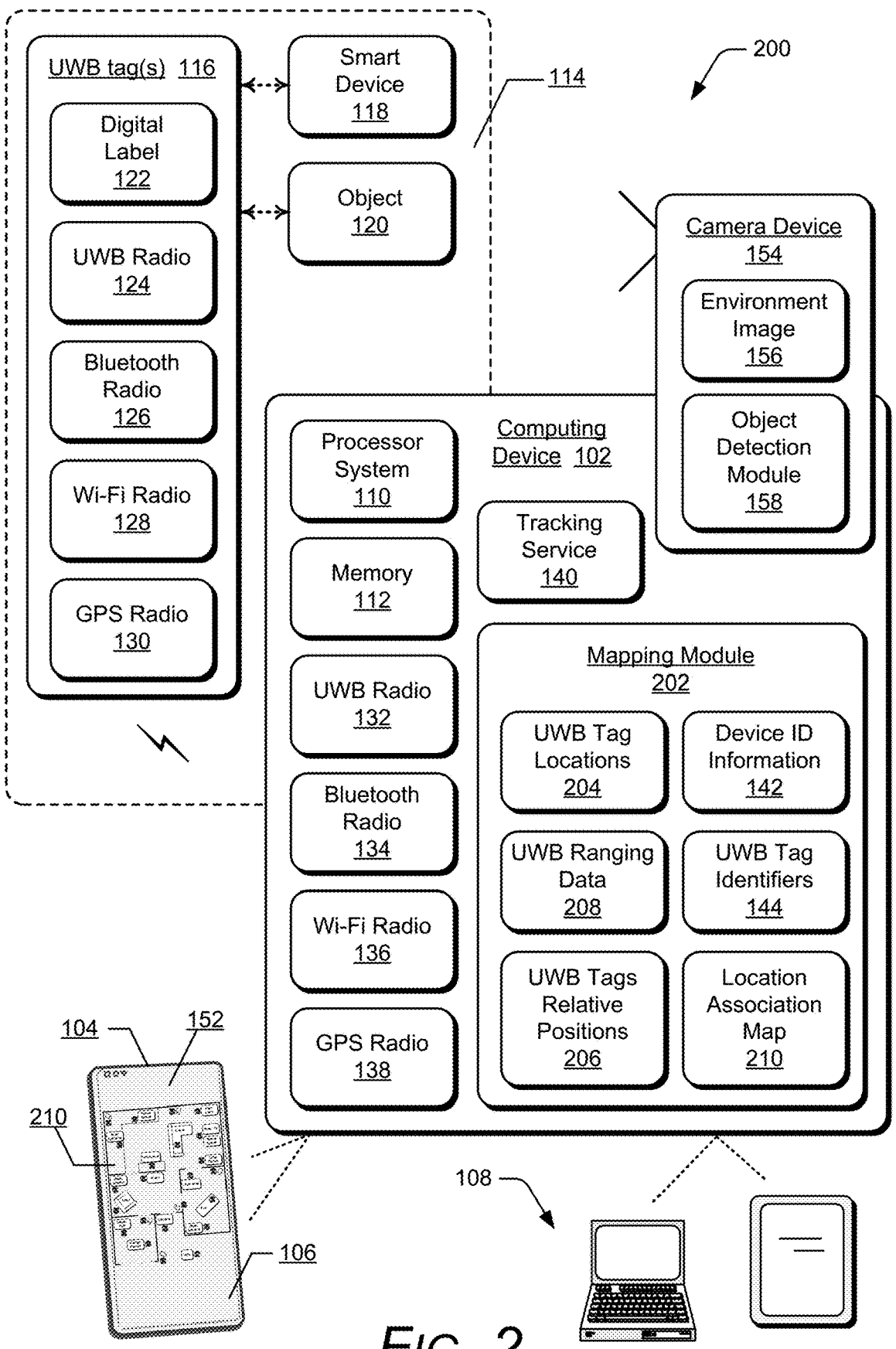
FIG. 2 further illustrates the example devices and features for object tracking based on UWB tags in accordance with one or more implementations as described herein.

FIG. 2 illustrates an example system 200 for environment mapping, aspects of which can be utilized to facilitate object tracking based on UWB tags, as described herein. Generally, the system 200 includes the computing device 102, which can be utilized to implement features and techniques of the environment mapping. In this example system 100, the computing device 102 includes the components and tracking service 140 as shown and described with reference to FIG. 1. Additionally, the computing device 102 implements a mapping module 202, which may include independent processing, memory, and/or logic components functioning as a computing and/or electronic device integrated with the computing device 102. Alternatively or in addition, the mapping module 202 can be implemented in software, in hardware, or as a combination of software and hardware components. In this example, the mapping module 202 is implemented as a software application or module, such as executable software instructions (e.g., computer-executable instructions) that are executable with a processor (e.g., with the processor system 110) of the computing device 102 to implement the techniques and features for object tracking and environment mapping based on UWB tags, as described herein.

As a software application or module, the mapping module 202 can be stored on computer-readable storage memory (e.g., the memory 112 of the device), or in any other suitable memory device or electronic data storage implemented with the module. Alternatively or in addition, the mapping module 202 may be implemented in firmware and/or at least partially in computer hardware. For example, at least part of the module may be executable by a computer processor, and/or at least part of the module may be implemented in logic circuitry.

As described above, the UWB tag 116 that is located for association with the smart device 118 in the environment 114 can determine an identity of the smart device based on a Bluetooth MAC ADDR and/or other device identifying information communicated from the smart device. Generally, the UWB tags 116 can scan to receive the device identifying information 142 communicated from nearby smart devices in the environment. The device identifying information 142 can be communicated via Bluetooth or BLE from the smart devices as a device name, a Bluetooth MAC ADDR, and a received signal strength indication (RSSI). The UWB tag 116 can identify the smart device 118 that is located nearest to the UWB tag based on the device identifying information 142 received from the smart devices, and generate an ordered list of the smart devices based on the device identifying information to identify the smart device that is located nearest to the UWB tag. Additionally, the mapping module 202 implemented by the computing device 102 can receive the device identifying information 142 communicated from the smart devices in the environment, as well as the UWB tag identifiers 144 communicated from the UWB tags 116 in the environment.

In other implementations, and as described above, the computing device 102 can communicate with the UWB tags 116 and other smart devices 118 in the environment 114, receiving Bluetooth or BLE advertised communications from the UWB tags and smart devices. The computing device implements the mapping module 202, which can correlate a UWB tag 116 with a nearby smart device 118 based on RSSI measurements of the Bluetooth or BLE advertised communications from the UWB tags and smart devices. For example, the computing device 102 can receive advertised signals from the UWB tags 116 and the smart devices 118, and the mapping module 202 compares the signal path loss from the received signals to determine which of the UWB tags and smart devices are proximate each other based on similar signal path loss. The mapping module 202 can then associate a UWB tag with a nearby smart device, and communicate the association back to the UWB tag, such as via in-band UWB communications.

In aspects of the described techniques, the mapping module 202 implemented by the computing device 102 can determine a UWB tag location 204 of each of the UWB tags 116 in the environment 114, and determines the relative positions 206 of each of the UWB tags with respect to each other. The mapping module 202 can obtain UWB ranging data 208, such as time-of-flight (ToF), angle-of-arrival (AoA), and/or time-difference-of-arrival (TDoA) data, as received from the UWB tags 116 via in-band session exchanges with the UWB radio 132 of the computing device 102. The ToF is a two-way communication between a UWB tag 116 and another device, while TDoA is one-way communication, where the UWB tag 116 communicates a signal but does not need to wait for a reply, such as from the computing device 102. The mapping module 202 may also receive and utilize other communication data that is shared over Bluetooth or BLE, such as relative position data shared between UWB devices. The mapping module 202 can then determine the UWB tag location 204 and the relative position 206 of each of the UWB tags 116 in the environment 114 based on the UWB ranging data 208.

The mapping module 202 can then generate a location association map 210 of the smart devices 118 and/or the objects 120 in the environment 114 based on the UWB tag location 204 and the relative position 206 of each of the UWB tags 116 associated with the respective smart devices and objects. For an environment within a building, such as in a smart home environment, the mapping module 202 can generate the location association map 210 as a floor plan in a three-dimension coordinate system of the environment 114, including the location of the smart devices and/or the objects in the building environment. An example of a location association map 210 showing the location of the smart devices and/or the objects in the environment 114 is further shown and described with reference to FIG. 3.

As a device application, the mapping module 202 may have an associated application user interface 152 that is generated and displayed for user interaction and viewing, such as on the display screen 106 of the wireless device 104. Generally, an application user interface 152, or any other type of video, image, graphic, and the like is digital image content that is displayable on the display screen 106 of the wireless device 104. The mapping module 202 can initiate to display the location association map 210 on the display screen of the wireless device 104, such as in the user interface 152 of the mapping module.

Although the mapping module 202 is shown and described as being implemented by the computing device 102 in the environment 114, any of the other smart devices in the environment may implement the mapping module 202 and/or an instantiation of the mapping module. For example, the system 100 includes the camera device 154, which may be an independent electronic, computing, and/or communication device in the environment 114, and can implement the mapping module 202. Similarly, a control device or controller logic in the environment 114 can implement the mapping module, as well as a UWB tag 116 may implement the mapping module 202 in the environment.

In a building environment, such as in a smart home implementation, the mapping module 202 can generate the location association map 210 of the smart devices 118 and/or the objects 120 in the environment 114 based on the identified objects and/or smart devices in the environment, as determined by the object detection module 158 from a captured environment image 156. The mapping module 202 can then generate the location association map 210 as a floor plan of the building, including the objects and/or the smart devices locations in the building, with the floor plan including positions of walls of the building as determined from the captured environment image 156. An example of a location association map 210 generated as a floor plan including positions of walls of the building, as well as the locations of the smart devices and/or the objects in the environment 114, is further shown and described with reference to FIG. 4.

In an example use case, a user can start the mapping module 202 as an application on the wireless device 104 (e.g., a mobile phone), as well as place the UWB tags 116 for association with the smart devices 118 and/or the objects 120 in the environment 114. An operational mode of the UWB tags 116 can be enabled, as well as an advertising mode, discoverable mode, or other type of operational mode initiated on the smart devices 118. The UWB tags 116, as well as the wireless device 104, can then scan for the Bluetooth or BLE advertising and/or other identifiable RF packets advertised as messages from the devices. The mapping module 202 can initiate to query the UWB tags 116 for a BLE MAC ADDR report, device name, RSSIs, and any other type of device identifying information.

Additionally, the UWB tags 116 can generate an ordered list of proximate smart devices 118 based on RSSI and/or reported transmission power to assess which of the smart devices is the closest to a particular UWB tag. The mapping module 202 implemented by the wireless device 104 can also compare the UWB tag reports against its own database of device identifying information 142 and UWB tag identifiers 144. Additionally, the mapping module 202 can then compare the signal path loss of the signals received from the UWB tags and smart devices to determine which of the UWB tags and smart devices are proximate each other based on similar signal path loss. Notably, a user can override any of the UWB tag and device determined associations, either by a UWB tag itself or by the mapping module, and the user can designate which one of the UWB tags is associated with a particular device or other object.

In implementations, some reported BLE MAC ADDRs may be random addresses due to the BLE privacy feature, and are unresolvable by a UWB tag 116 without an identity resolving key that is otherwise available on the wireless device 104, given that the wireless device has been previously paired with the smart devices 118 using random addressing. For these obscure BLE MAC ADDRs due to random addresses, or unpaired devices not transmitting identifiable information, the wireless device 104 can disambiguate, communicate the appropriate address to the UWB tag 116, and update the database for the UWB tag identifiers 144. A UWB tag identifier 144 can be generated automatically by the mapping module 202, or optionally, a user of the device may be prompted via the user interface 152 to approve or change the generated UWB tag identifiers 144 and designated associations with objects and/or smart devices. For further disambiguation of the UWB tags 116 associated with the smart devices 118 and/or other objects 120 in the environment 114, the camera device 154 can be used to capture the environment image 156. The object detection module 158 can then determine the location of the smart devices 118 and/or the other objects 120 in the environment, and the location information is used by the mapping module 202 to generate the location association map 210.

Figure 3:
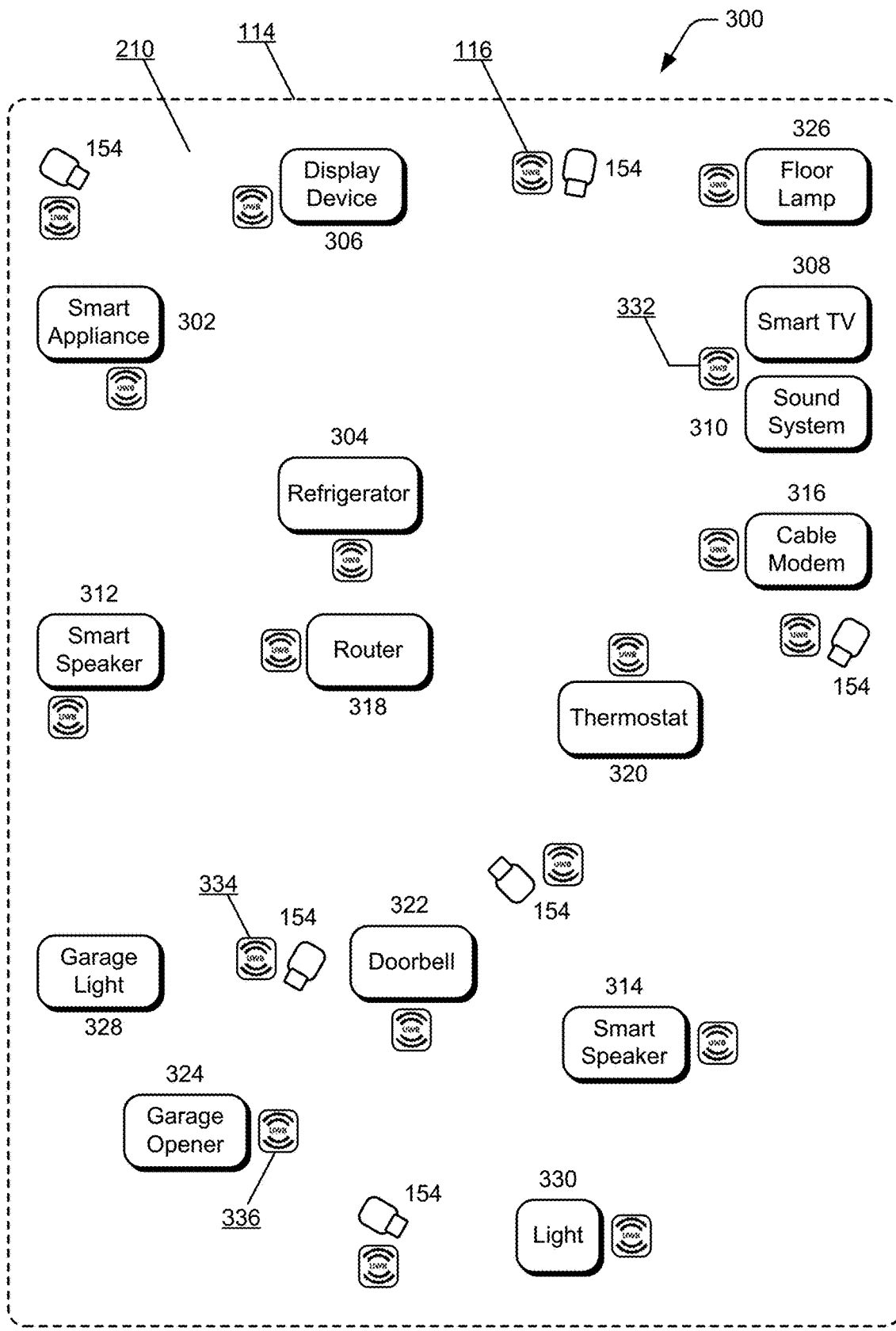
FIGS. 3 and 4 illustrate examples of location association maps generated for object tracking based on UWB tags in accordance with one or more implementations as described herein.

FIG. 3 illustrates an example 300 of a location association map 210 showing the location of smart devices and/or objects in the environment 114, such as generated by the mapping module 202 implemented by the computing device 102, as shown and described above with reference to FIGS. 1 and 2. In this example 300, the location association map 210 shows the position of the smart devices and other objects relative to each other in the environment 114, as determined based on the precise location positioning capabilities of UWB utilizing the UWB tags 116. The environment 114 includes examples of the smart devices 118, such as a smart appliance 302 and refrigerator 304, a display device 306, a smart TV 308 and sound system 310, smart speakers 312, 314, a cable modem 316 and router 318, a thermostat 320 and smart doorbell 322, and a garage door opener 324. The environment 114 also includes examples of other objects 120, such as a floor lamp 326, a garage light 328, and an outdoor light 330. The environment 114 also includes several examples of the camera devices 154 positioned at various locations throughout the environment.

In this example 300, the location association map 210 shows the relative locations of the smart devices and other objects to each other in the environment 114, without walls of the building in the home environment. In an aspect of environment mapping, it should be noted that one UWB tag 116 can be associated with more than one object and/or smart device in the environment, and can be labeled accordingly to provide the user a meaningful identifier that represents the combined objects and/or smart devices. For example, the UWB tag 332 is positioned for association with both the smart TV 308 and the sound system 310, and the UWB tag may be identified as "entertainment center."

In another aspect of the environment mapping, two or more of the UWB tags 116 can be used to associate and locate objects that are not tagged in their spatial location. For example, the garage light 328 does not have an associated UWB tag. However, the two UWB tags 334, 336 (e.g., in the garage) can be used to determine the relative position of the garage light 328 in the environment for spatial awareness. The associated camera device 154 may also be used to capture an environment image 156 of the region (e.g., in the garage), and the environment image can be used to further determine the relative position of the garage light 328 in the environment for spatial awareness.

Figure 4:
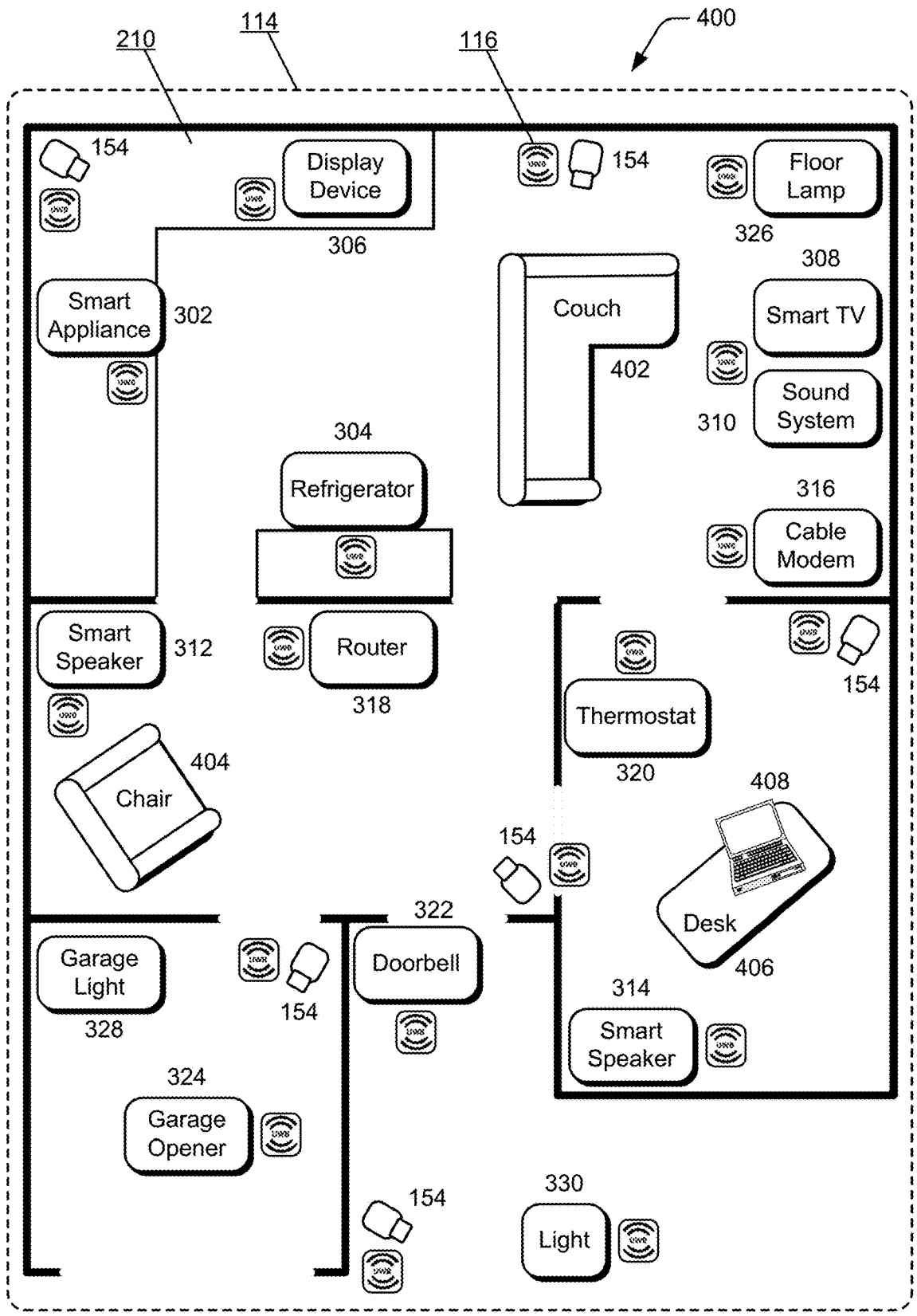

FIG. 4 similarly illustrates an example 400 of a location association map 210 showing the location of the smart devices and/or objects in the environment 114, such as generated by the mapping module 202 implemented by the computing device 102, as shown and described above with reference to FIGS. 1-3. Further, in this example 400 of a building environment, the mapping module 202 generates the location association map 210 of the smart devices and the other objects based on the identified objects and smart devices in the environment, as determined by the object detection module 158 from captured environment images 156. The various camera devices 154 positioned at locations throughout the environment 114 can be used to capture the environment images 156 of the different regions of the environment.

The mapping module 202 generates the location association map 210 as a floor plan of the building, including positions of walls of the building as determined from the captured environment images 156. The location association map 210 shows the position of each of the smart devices and other objects relative to each other in the environment 114, as well as the walls of the home environment, which provides a more detailed spatial context. In addition to the smart devices and objects shown in the location association map 210 in FIG. 3, this example 400 also includes other objects determined from the captured environment images 156. For example, the mapped environment also includes the location and position of a couch 402, a chair 404, and a desk 406 in various rooms of the home environment.

Additionally, a UWB-enabled laptop computing device 408 has been added into the environment, and the laptop computing device communicates via a UWB radio with the UWB tags 116 in the environment. The laptop computing device 408 can be implemented as an example of the computing device 102, which is shown and described with reference to FIGS. 1 and 2. Notably, the laptop computing device 408 can implement the mapping module 202 to facilitate mapping the objects and/or devices in the environment 114, based on the locations and relative positions of each of the UWB tags. The wireless UWB communications for mapping objects and/or devices in the environment 114 are similar between the UWB tags and/or UWB-embedded smart devices in the environment.

Although shown and described as a single-elevation floorplan in the described examples of the location association map 210, the environment 114 may be a multi-elevation home or building environment. Notably, the system of UWB tags 116 also provides for z-elevation differentiation using the precise location positioning capabilities of UWB for a three-dimension coordinate mapping of a multi-elevation home environment.

Figure 5:
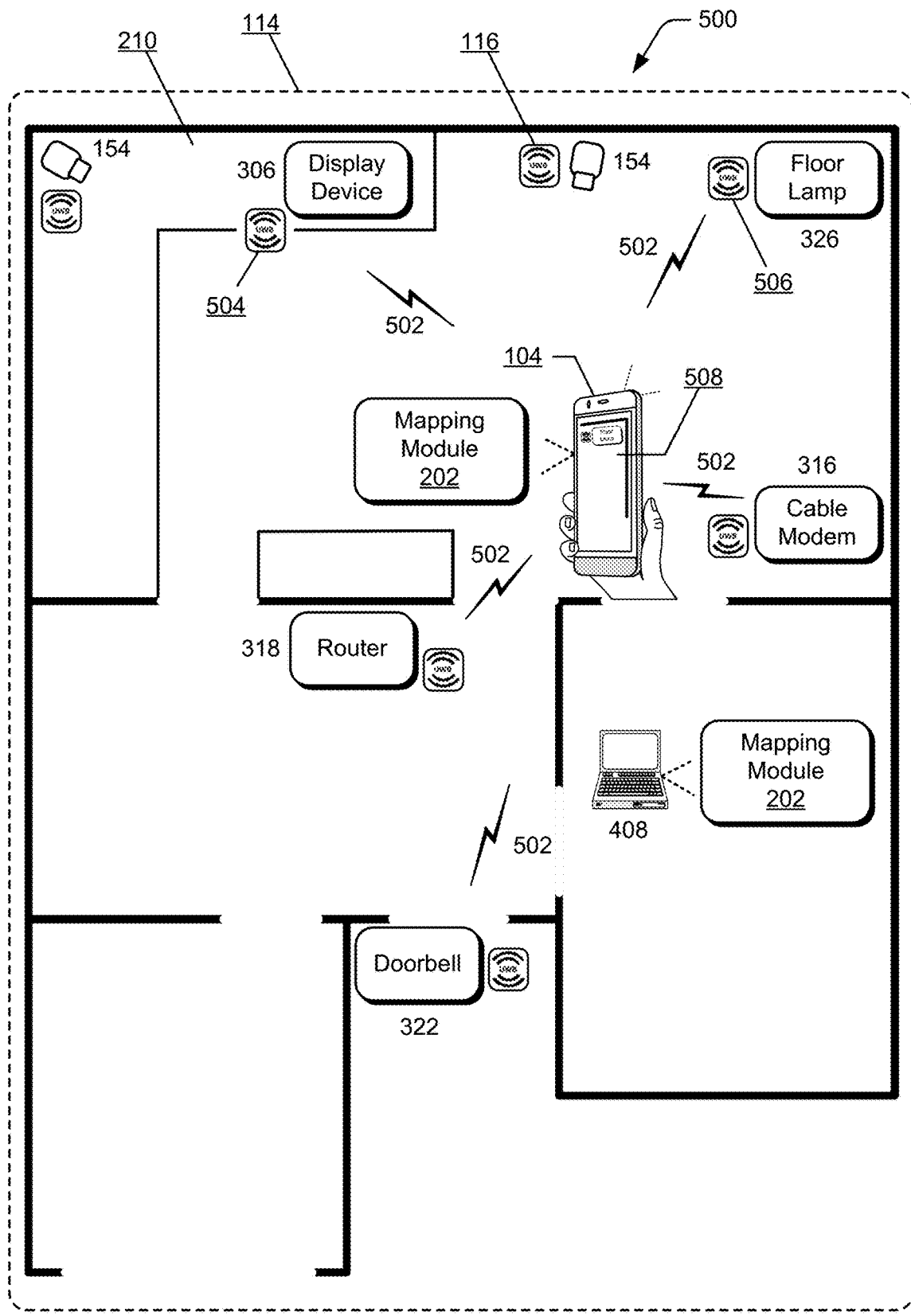
FIG. 5 illustrates examples of UWB tags and devices location association in accordance with one or more implementations described herein.

FIG. 5 further illustrates examples 500 of UWB tags and devices location association in accordance with one or more implementations of object tracking and environment mapping based on UWB tags, as described herein. The example of the environment 114 as shown in FIGS. 3 and 4 is further illustrated with additional example details of the mapping module 202, as implemented in a computing device 102, such as the wireless device 104 (e.g., a mobile phone or other device) in the environment. In these examples 500, the wireless device 104 communicates via the UWB radio 132 with the UWB tags 116 in the environment. Similarly, the wireless device 104 can also communicate via the Bluetooth radio 134 and/or the Wi-Fi radio 136 with other smart devices in the environment, such as the display device 306, the cable modem 316, the router 318, the smart doorbell 322, and the laptop computing device 408, to name a few. Although these examples 500 are described with reference to the wireless device 104 implementing the mapping module 202, it should be noted that the laptop computing device 408 may also implement the mapping module 202, and operate independently or in conjunction with the instantiation of the mapping module as implemented by the wireless device.

The mapping module 202 receives (via wireless device 104) the Bluetooth or BLE advertised communications 502 from the UWB tags 116 and other smart devices in the environment 114. The mapping module 202 can then correlate a UWB tag 116 with a nearby smart device based on RSSI measurements of the Bluetooth or BLE advertised communications 502 from the UWB tags and smart devices. For example, the wireless device 104 can receive advertised signals from a UWB tag 504 and the smart display device 306, and the mapping module 202 compares the signal path loss from the received signals to determine that the UWB tag 504 and the smart display device 306 are proximate each other based on similar signal path loss. The mapping module 202 can then associate the UWB tag 504 with the nearby smart display device 306, and communicate the association back to the UWB tag 504, such as via in-band UWB communications.

In a similar implementation, the mapping module 202 receives (via wireless device 104) the Bluetooth or BLE advertised communications 502 from a UWB tag 506 that is proximate a non-communicative, static object, such as the floor lamp 326 in the environment 114. The mapping module 202 can utilize the received signals and a captured environment image 508 to determine that the UWB tag 506 is proximate the floor lamp 326, associate the UWB tag 506 with the nearby object, and communicate the association back to the UWB tag 506, such as via in-band UWB communications. As noted above, a user of the wireless device 104 can override any of the UWB tag and device determined associations by the mapping module, and the user can designate any one of the UWB tags as being associated with a particular device or other object.

Figure 6:
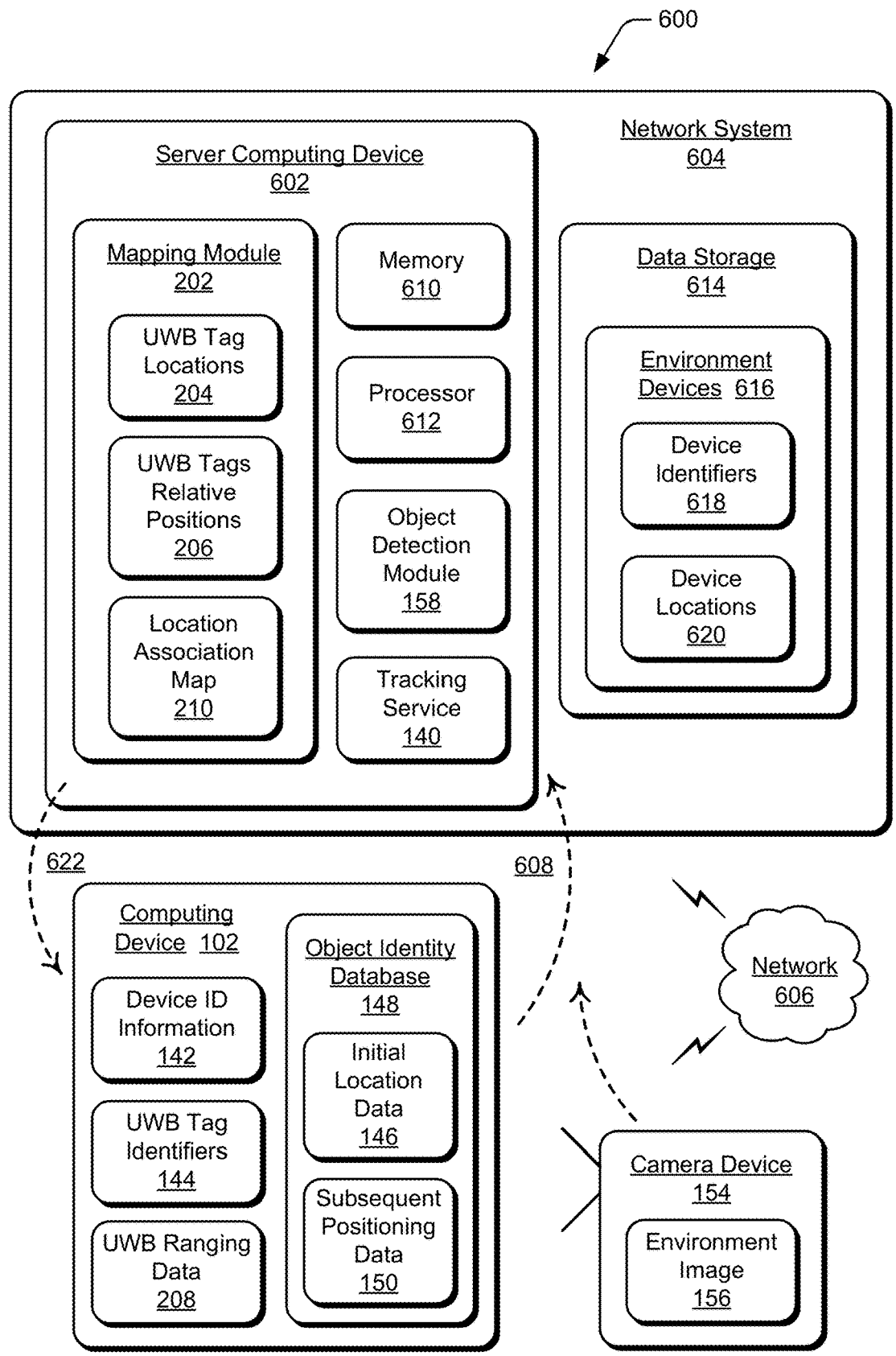
FIG. 6 illustrates an example cloud-based network system in which aspects and features of object tracking based on UWB tags can be implemented.

FIG. 6 illustrates an example of a cloud-based network system 600 in which aspects and features of object tracking and environment mapping based on UWB tags can be implemented. The example system 600 includes the computing device 102 and the camera device 154, such as shown and described with reference to FIGS. 1 and 2. In this example system 600, the computing device 102 and the camera device 154 are implemented to access and communicate with a server computing device 602 of a network system 604, such as via a communication network 606. The server computing device 602 implements an instantiation of the mapping module 202 to determine the UWB tag locations 204 of each of the UWB tags 116 in the environment 114, determine the relative positions 206 of each of the UWB tags with respect to each other, and generate the location association map 210. The server computing device 602 also implements an instantiation of the object detection module 158 to identify the objects and/or smart devices in regions of the environment from the environment images 156 captured by the camera devices 154 positioned in the environment. The server computing device 602 also implements an instantiation of the tracking service 140 that can monitor the movements of objects that are identified based on only their respective initial location data.

The camera device 154 can upload the environment images 156 to the network system 604 via the communication network 606. In aspects of environment mapping, the computing device 102 can upload the received device identifying information 142, the UWB tags identifiers 144, the UWB ranging data 208, and any other type of environment data to the network system 604 for processing and evaluation by the mapping module 202 that is implemented by the server computing device 602. In aspects of object tracking based on UWB tags as described herein, the computing device 102 can upload the data maintained in the object identity database 148, such as the initial location data 146 and the subsequent positioning data 150 for each of the respective smart devices and objects.

The upload of data from the camera device 154 and/or from the computing device 102 to the network system 604 may be automatically controlled by the respective devices, or optionally, initiated by a user of the devices. The network system 604 can receive the uploaded environment data as inputs to the mapping module 202 from the computing device 102 and/or the camera device 154, as indicated at 608 via the communication network 606. Similarly, the network system 604 can receive the uploaded data maintained in the object identity database 148 as inputs to the tracking service 140 from the computing device 102.

Any of the devices, applications, modules, servers, and/or services described herein can communicate via the communication network 606, such as for data communication between the computing device 102 and the network system 604, and for data communication between the camera device 154 and the network system. The communication network 606 can be implemented to include a wired and/or a wireless network. The communication network can also be implemented using any type of network topology and/or communication protocol, and can be represented or otherwise implemented as a combination of two or more networks, to include IP-based networks and/or the Internet. The communication network 606 may also include mobile operator networks that are managed by a mobile network operator and/or other network operators, such as a communication service provider, mobile phone provider, and/or Internet service provider.

In this example cloud-based network system 600, the network system 604 is representative of any number of cloud-based access sites that provide a service and/or from which data and information is available, such as via the Internet, for on-line and/or network-based access. The network system 604 can be accessed on-line, and includes the server computing device 602, which is representative of one or more hardware server devices (e.g., computing devices) that may be implemented at the network system. The server computing device 602 includes memory 610 and a processor 612, and may include any number and combination of different components as further described with reference to the example device shown in FIG. 9.

In this example cloud-based network system 600, the server computing device 602 implements the mapping module 202, the object detection module 158, and/or the tracking service 140, such as in software, in hardware, or as a combination of software and hardware components, generally as shown and described with reference to FIGS. 1 and 2. In this example, the mapping module 202, the object detection module 158, and the tracking service 140 are implemented as software applications or modules, such as executable software instructions (e.g., computer-executable instructions) that are executable with a processing system (e.g., the processor 612) of the server computing device 602 to implement the techniques of object tracking based on UWB tags. The mapping module 202, the object detection module 158, and the tracking service 140 can be stored on computer-readable storage media, such as any suitable memory device (e.g., the device memory 610) or on electronic data storage implemented in the server computing device 602 and/or at the network system 604.

The network system 604 may include multiple data storage, server devices, and applications, and can be implemented with various components as further described with reference to the example device shown in FIG. 9. The network system 604 includes data storage 614 that may be implemented as any suitable memory or electronic data storage for network-based data storage. The data storage 614 is utilized at the network system 604 to maintain any type of environment data and device information, such as in a database of environment devices 616, with associated device identifiers 618 and device locations 620 in an environment. The device locations 620 may also include global positioning system (GPS) data that indicates the locations of the objects 120 and/or the smart devices 118 in the environment 114, such as in a smart home environment.

The data storage 614 can also be utilized at the network system 604 to maintain any type of the uploaded environment data, such as the uploaded environment images 156 and/or the various UWB tags locations 204 in the environment 114, the UWB tags relative positions 206 with respect to each other, and the location association map 210 determined by the mapping module 202, as shown and described with reference to FIGS. 1-5. The environment and device information determined by the mapping module 202 and/or by the object detection module 158 can then be communicated as feedback from the network system 604 to the computing device 102, as indicated at 622 via the communication network 606.

Example methods 700 and 800 are described with reference to respective FIGS. 7 and 8 in accordance with implementations for object tracking based on UWB tags. Generally, any services, components, modules, methods, and/or operations described herein can be implemented using software, firmware, hardware (e.g., fixed logic circuitry), manual processing, or any combination thereof. Some of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 7:
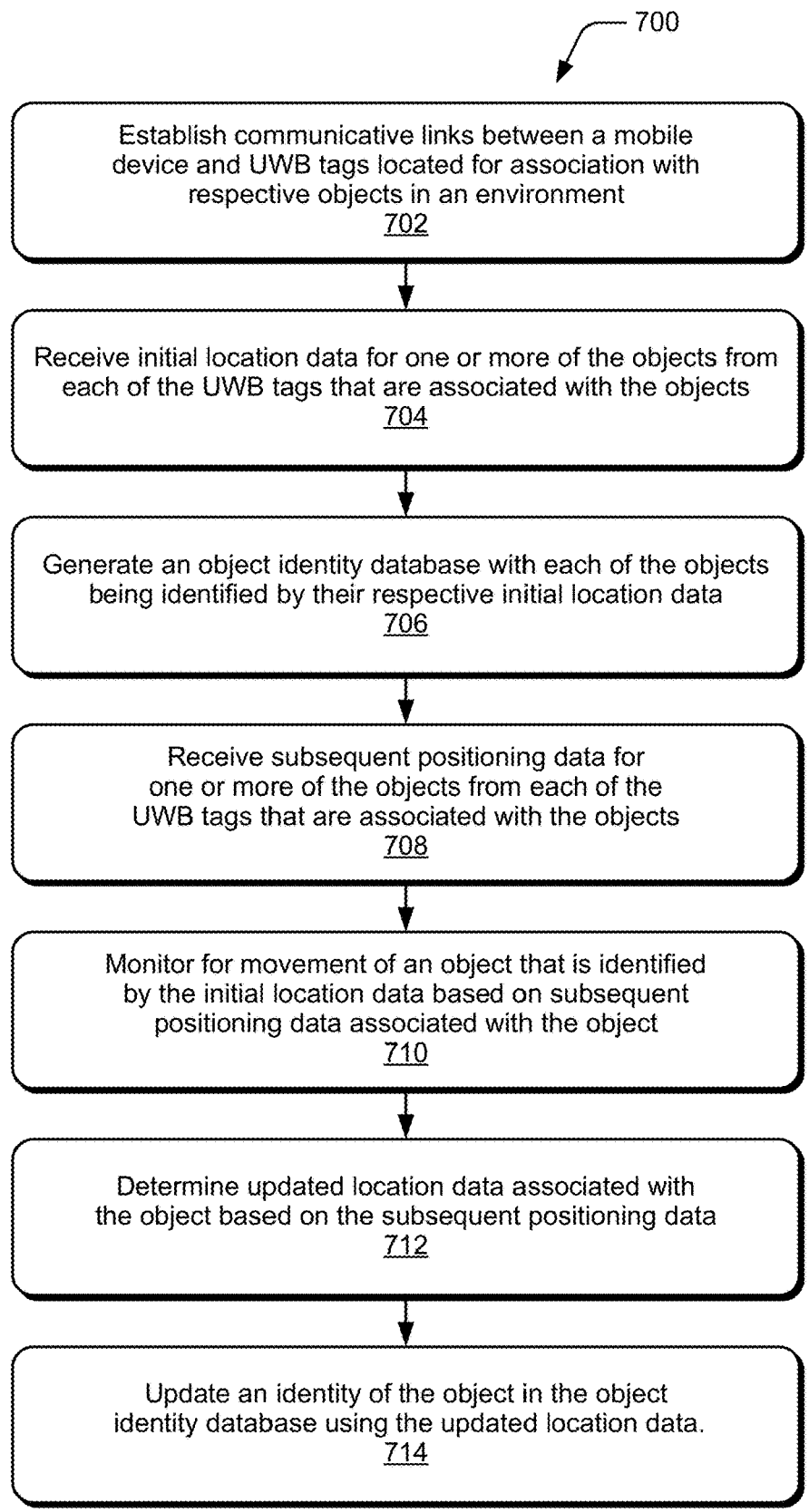
FIGS. 7-8 illustrate example methods for object tracking based on UWB tags in accordance with one or more implementations of the techniques described herein.

FIG. 7 illustrates example method(s) 700 for object tracking based on UWB tags, and is generally described with reference to a tracking service implemented by a computing device. The order in which the method is described is not intended to be construed as a limitation, and any number or combination of the described method operations can be performed in any order to perform a method, or an alternate method.

At 702, communicative links are established between a mobile device and UWB tags located for association with respective objects in an environment. For example, the wireless device 104 is communicatively linked, generally by wireless connection, to the UWB tags 116 in the environment 114, which can include the computing device 102.

At 704, initial location data for one or more of the objects is received from each of the UWB tags that are associated with the objects. For example, the tracking service 140 implemented by the computing device 102 receives the initial location data 146 for the smart devices and/or the objects from each of the UWB tags 116 that are associated with the smart devices and the objects. In implementations, the tracking service 140 receives the initial location data 146 for the smart devices and/or the objects as any type of positioning system data, such as GPS data via the GPS radio 138 of the computing device. An object that is a smart device 118 and GPS-enabled can communicate its own GPS data to an associated UWB tag 116, which can then communicate the GPS data to the computing device 102 via the GPS radio 130.

At 706, an object identity database is generated with each of the objects being identified by their respective initial location data. For example, the tracking service 140 implemented by the computing device 102 generates the object identity database 148 in which each of the smart devices and/or objects are identified by their respective initial location data 146. Notably, the smart devices and/or the objects are each identified in the object identity database 148 by only the initial location data 146, without additional device identifying information.

At 708, subsequent positioning data for one or more of the objects is received from each of the UWB tags that are associated with the objects. For example, the tracking service 140 implemented by the computing device 102 receives the subsequent positioning data 150 associated with the smart device 118 and/or the object 120 as updated GPS data.

At 710, movement of an object that is identified by the initial location data is monitored based on subsequent positioning data associated with the object. For example, the tracking service 140 implemented by the computing device 102 monitors for movement of a smart device 118 and/or an object 120 that is identified by the initial location data 146 based on the subsequent positioning data 150 associated with the device or object. The movements of the smart devices and/or objects are monitored by the tracking service 140 for a security determination as to an unauthorized relocation of an object, for a cluster of multiple objects moving together in an unauthorized manner, and/or for an abnormal proximity of multiple objects in the environment.

At 712, updated location data associated with the object is determined based on the subsequent positioning data and, at 714, an identity of the object is updated in the object identity database using the updated location data. For example, the tracking service 140 implemented by the computing device 102 determines updated location data associated with a smart device 118 or an object 120 based on the subsequent positioning data 150, and updates an identity of the device or the object in the object identity database 148 using the updated location data. Additionally, a location association map can be generated for object tracking, which indicates the movements of the one or more objects in a three-dimension coordinate system of the environment. For example, the mapping module 202 implemented by the computing device 102 generates the location association map 210 of the smart devices 118 and/or the objects 120 in the environment 114 based on the UWB tag location 204 and the relative position 206 of each of the UWB tags 116 associated with the respective smart devices and objects.

Figure 8:
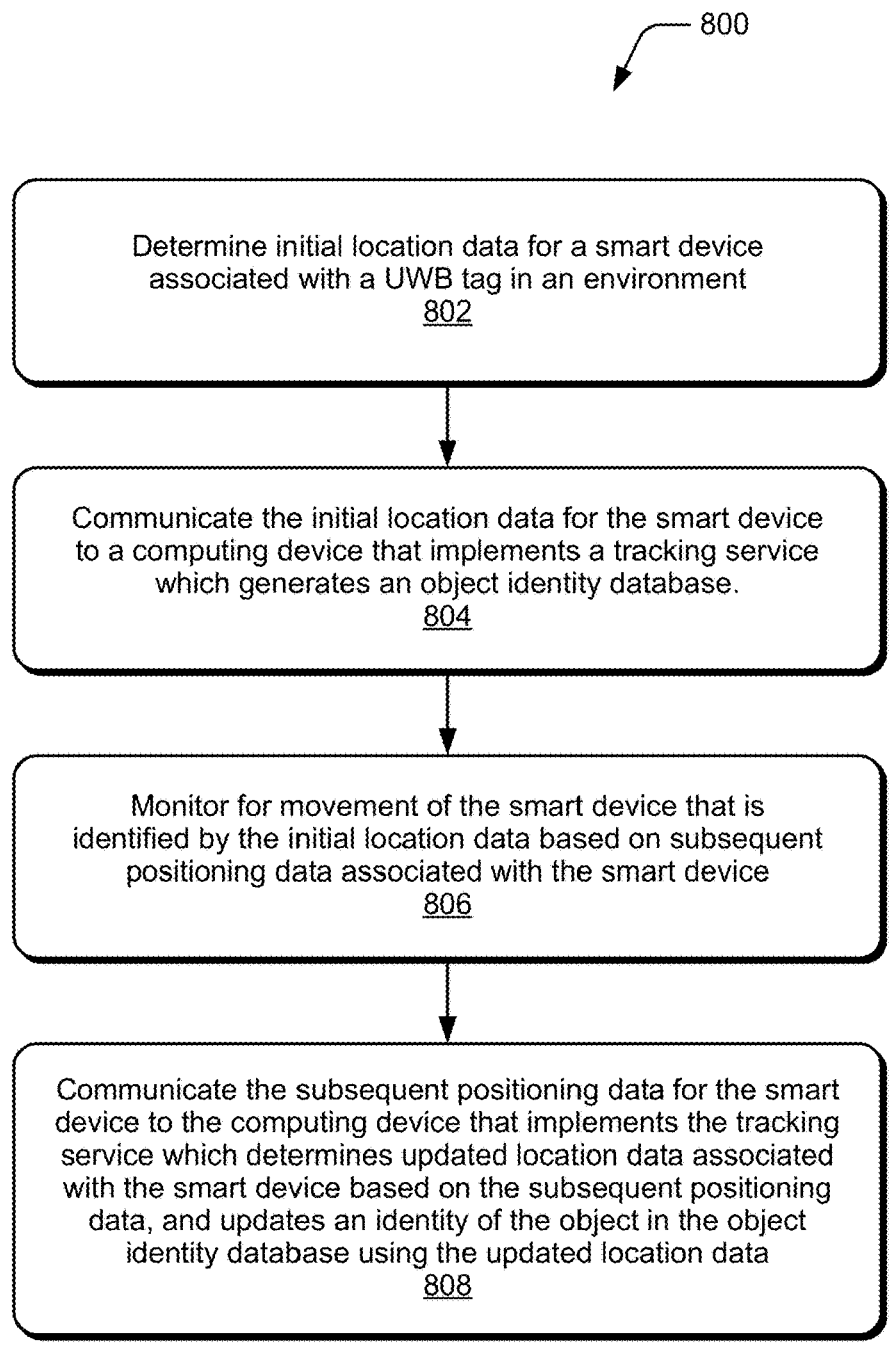

FIG. 8 illustrates example method(s) 800 for object tracking based on UWB tags. The order in which the method is described is not intended to be construed as a limitation, and any number or combination of the described method operations can be performed in any order to perform a method, or an alternate method.

At 802, initial location data is determined for a smart device associated with a UWB tag. For example, one or more UWB tags 116 are located for association with respective smart devices 118 in the environment 114, and each UWB tag is identified with a digital label 122 indicative of the association with one of the smart devices. A UWB tag 116 that is associated with a smart device 118 determines the initial location data for a smart device associated with the UWB tag. In implementations, the smart devices 118 each include a GPS radio configured to communicate the initial location data 146 and the subsequent positioning data 150 to the UWB tag 116 associated with a smart device.

At 804, the initial location data for the smart device is communicated to a computing device that implements a tracking service which generates an object identity database. For example, a UWB tag 116 communicates the initial location data 146 to the computing device 102 that implements the tracking service 140, which receives the initial location data 146 for the smart device. In implementations, the UWB tag 116 communicates the initial location data 146 for the smart device 118 as any type of positioning system data, such as GPS data via the GPS radio 130 of the UWB tag. The tracking service 140 generates the object identity database 148 in which each of the smart devices are identified by their respective initial location data 146, and without additional device identifying information.

At 806, movement of the smart device that is identified by the initial location data is monitored based on subsequent positioning data associated with the smart device. For example, the UWB tag 116 that is associated with the smart device 118 monitors for movement of the smart device that it identified by the initial location data 146 based on the subsequent positioning data 150 associated with the smart device.

At 808, the subsequent positioning data for the smart device is communicated to the computing device that implements the tracking service which determines updated location data associated with the smart device based on the subsequent positioning data, and updates an identity of the object in the object identity database using the updated location data. For example, the UWB tag 116 that is associated with the smart device 118 communicates the subsequent positioning data 150 that is associated with the smart device to the computing device 102 that implements the tracking service. The tracking service 140 determines updated location data associated with a smart device 118 or an object 120 based on the subsequent positioning data 150, and updates an identity of the device or the object in the object identity database 148 using the updated location data.

Figure 9:
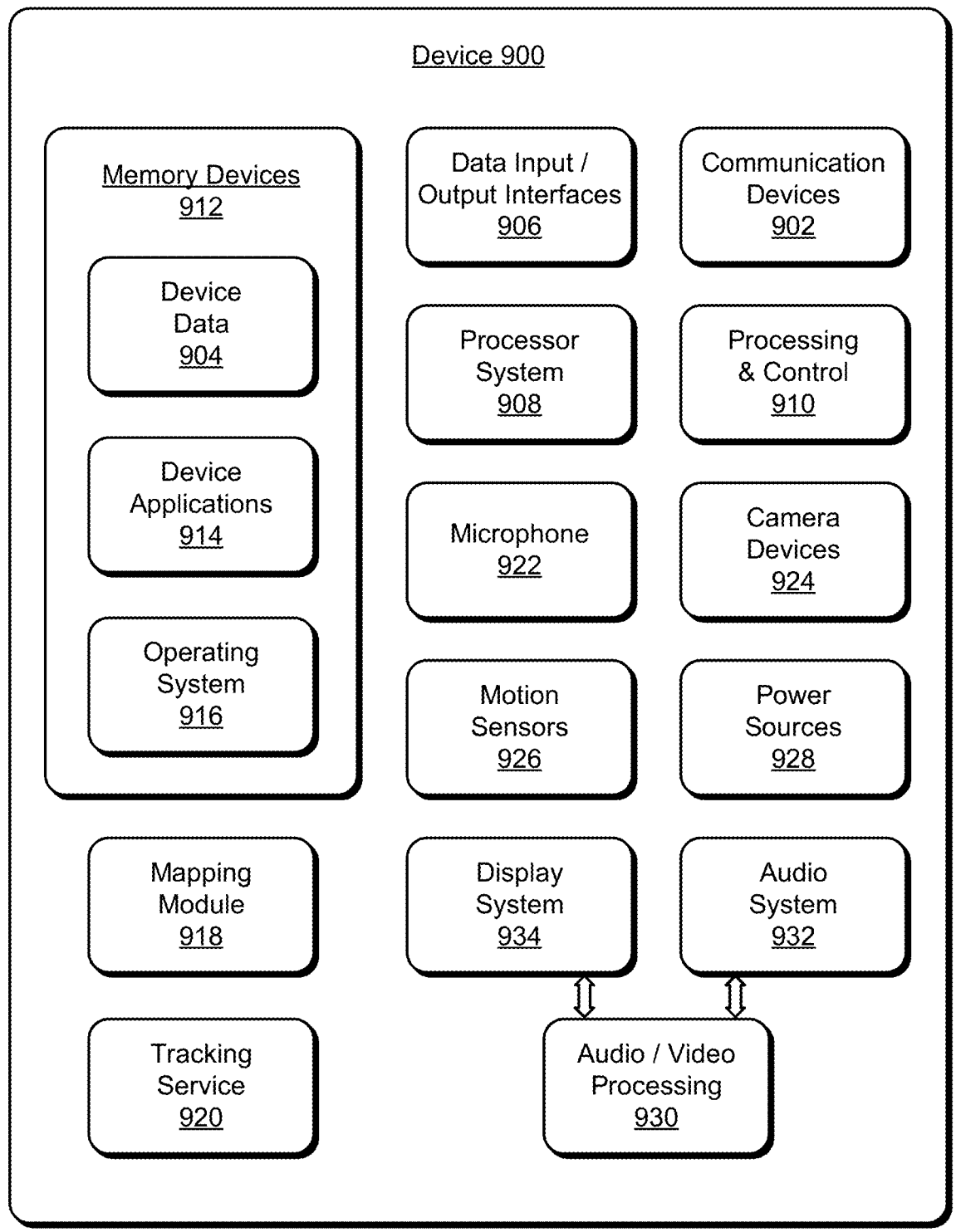
FIG. 9 illustrates various components of an example device that can be used to implement the techniques for object tracking based on UWB tags as described herein.

FIG. 9 illustrates various components of an example device 900, which can implement aspects of the techniques and features for object tracking based on UWB tags, as described herein. The example device 900 can be implemented as any of the devices described with reference to the previous FIGS. 1-8, such as any type of a wireless device, mobile device, mobile phone, flip phone, client device, companion device, paired device, display device, tablet, computing, communication, entertainment, gaming, media playback, and/or any other type of computing and/or electronic device. For example, the computing device 102, the camera device 154, and/or a UWB tag 116 described with reference to FIGS. 1-8 may be implemented as the example device 900.

The example device 900 can include various, different communication devices 902 that enable wired and/or wireless communication of device data 904 with other devices. The device data 904 can include any of the various devices data and content that is generated, processed, determined, received, stored, and/or communicated from one computing device to another. Generally, the device data 904 can include any form of audio, video, image, graphics, and/or electronic data that is generated by applications executing on a device. The communication devices 902 can also include transceivers for cellular phone communication and/or for any type of network data communication.

The example device 900 can also include various, different types of data input/output (I/O) interfaces 906, such as data network interfaces that provide connection and/or communication links between the devices, data networks, and other devices. The I/O interfaces 906 can be used to couple the device to any type of components, peripherals, and/or accessory devices, such as a computer input device that may be integrated with the example device 900. The I/O interfaces 906 may also include data input ports via which any type of data, information, media content, communications, messages, and/or inputs can be received, such as user inputs to the device, as well as any type of audio, video, image, graphics, and/or electronic data received from any content and/or data source.

The example device 900 includes a processor system 908 of one or more processors (e.g., any of microprocessors, controllers, and the like) and/or a processor and memory system implemented as a system-on-chip (SoC) that processes computer-executable instructions. The processor system 908 may be implemented at least partially in computer hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the device can be implemented with any one or combination of software, hardware, firmware, or fixed logic circuitry that may be implemented in connection with processing and control circuits, which are generally identified at 910. The example device 900 may also include any type of a system bus or other data and command transfer system that couples the various components within the device. A system bus can include any one or combination of different bus structures and architectures, as well as control and data lines.

The example device 900 also includes memory and/or memory devices 912 (e.g., computer-readable storage memory) that enable data storage, such as data storage devices implemented in hardware which can be accessed by a computing device, and that provide persistent storage of data and executable instructions (e.g., software applications, programs, functions, and the like). Examples of the memory devices 912 include volatile memory and non-volatile memory, fixed and removable media devices, and any suitable memory device or electronic data storage that maintains data for computing device access. The memory devices 912 can include various implementations of random-access memory (RAM), read-only memory (ROM), flash memory, and other types of storage media in various memory device configurations. The example device 900 may also include a mass storage media device.

The memory devices 912 (e.g., as computer-readable storage memory) provide data storage mechanisms, such as to store the device data 904, other types of information and/or electronic data, and various device applications 914 (e.g., software applications and/or modules). For example, an operating system 916 can be maintained as software instructions with a memory device 912 and executed by the processor system 908 as a software application. The device applications 914 may also include a device manager, such as any form of a control application, software application, signal-processing and control module, code that is specific to a particular device, a hardware abstraction layer for a particular device, and so on.

In this example, the device 900 includes a mapping module 918 and a tracking service 920 that implements various aspects of the described features and techniques for object tracking based on UWB tags. The mapping module 918 and the tracking service 920 can each be implemented with hardware components and/or in software as one of the device applications 914, such as when the example device 900 is implemented as the computing device 102 and/or the camera device 154 described with reference to FIGS. 1-8. An example of the mapping module 918 includes the mapping module 202 and an example of the tracking service 920 includes the tracking service 140 that is implemented by the computing device 102, such as software applications and/or as hardware components in the computing device. In implementations, the mapping module 918 and/or the tracking service 920 may include independent processing, memory, and logic components as a computing and/or electronic device integrated with the example device 900.

The example device 900 can also include a microphone 922 and/or camera devices 924, as well as motion sensors 926, such as may be implemented as components of an inertial measurement unit (IMU). The motion sensors 926 can be implemented with various sensors, such as a gyroscope, an accelerometer, and/or other types of motion sensors to sense motion of the device. The motion sensors 926 can generate sensor data vectors having three-dimensional parameters (e.g., rotational vectors in x, y, and z-axis coordinates) indicating location, position, acceleration, rotational speed, and/or orientation of the device. The example device 900 can also include one or more power sources 928, such as when the device is implemented as a wireless device and/or mobile device. The power sources may include a charging and/or power system, and can be implemented as a flexible strip battery, a rechargeable battery, a charged super-capacitor, and/or any other type of active or passive power source.

The example device 900 can also include an audio and/or video processing system 930 that generates audio data for an audio system 932 and/or generates display data for a display system 934. The audio system and/or the display system may include any types of devices or modules that generate, process, display, and/or otherwise render audio, video, display, and/or image data. Display data and audio signals can be communicated to an audio component and/or to a display component via any type of audio and/or video connection or data link. In implementations, the audio system and/or the display system are integrated components of the example device 900. Alternatively, the audio system and/or the display system are external, peripheral components to the example device.

Although implementations for object tracking based on UWB tags have been described in language specific to features and/or methods, the appended claims are not necessarily limited to the specific features or methods described. Rather, the specific features and methods are disclosed as example implementations for object tracking based on UWB tags, and other equivalent features and methods are intended to be within the scope of the appended claims. Further, various different examples are described and it is to be appreciated that each described example can be implemented independently or in connection with one or more other described examples. Additional aspects of the techniques, features, and/or methods discussed herein relate to one or more of the following:

A system, comprising: ultra-wideband (UWB) tags located for association with respective objects in an environment, each UWB tag identified with a digital label indicative of the association with one or more of the objects; a tracking service implemented at least partially in hardware and configured to: receive initial location data for the one or more objects from each of the UWB tags that are associated with the one or more objects; generate an object identity database, each of the one or more objects identified by their respective initial location data; and monitor for movement of an object that is identified by the initial location data based on subsequent positioning data associated with the object.

Alternatively or in addition to the above described system, any one or combination of: the tracking service is configured to: determine updated location data associated with the object based on the subsequent positioning data; and update an identity of the object in the object identity database using the updated location data. The tracking service is configured to: receive the initial location data for the one or more objects as global positioning system (GPS) data; receive the subsequent positioning data associated with the one or more objects as updated GPS data; and determine movements of the one or more objects based on the updated GPS data. The one or more objects are smart devices that are each identified in the object identity database by only the initial location data without additional device identifying information. The one or more objects are each smart devices with a GPS radio configured to communicate the initial location data to a UWB tag associated with a smart device. The tracking service is configured to monitor the movements of the one or more objects for a security determination as to an unauthorized relocation of at least one of the objects. The tracking service is configured to monitor the movements of the one or more objects for a cluster of multiple objects moving together in an unauthorized manner. The tracking service is configured to monitor the movements of the one or more objects for an abnormal proximity of multiple objects in the environment. A mobile device configured to: implement the tracking service to determine movements of the one or more objects in the environment; implement a mapping module to generate a location association map that indicates the movements of the one or more objects in a three-dimension coordinate system of the environment; and display the location association map on a display screen of the mobile device, the location association map indicating current locations of the one or more objects in the environment.

A method, comprising: establishing communicative links between a mobile device and ultra-wideband (UWB) tags located for association with respective objects in an environment; receiving initial location data for one or more of the objects from each of the UWB tags that are associated with the one or more objects; generating an object identity database, each of the one or more objects identified by their respective initial location data; and monitoring for movement of an object that is identified by the initial location data based on subsequent positioning data associated with the object.

Alternatively or in addition to the above described method, any one or combination of: determining updated location data associated with the object based on the subsequent positioning data; and updating an identity of the object in the object identity database using the updated location data. The initial location data for the one or more objects is received as global positioning system (GPS) data; the subsequent positioning data associated with the one or more objects is received as updated GPS data; and movements of the one or more objects are determined based on the updated GPS data. The one or more objects are smart devices that are each identified in the object identity database by only the initial location data without additional device identifying information. The method further comprising monitoring the movements of the one or more objects for a security determination as to an unauthorized relocation of at least one of the objects. The method further comprising monitoring the movements of the one or more objects for a cluster of multiple objects moving together in an unauthorized manner. The method further comprising monitoring the movements of the one or more objects for an abnormal proximity of multiple objects in the environment. The method further comprising: generating a location association map that indicates the movements of the one or more objects in a three-dimension coordinate system of the environment; and displaying the location association map on a display screen of a mobile device, the location association map indicating current locations of the one or more objects in the environment.

A system, comprising: one or more ultra-wideband (UWB) tags located for association with respective smart devices in an environment, each UWB tag identified with a digital label indicative of the association with one of the smart devices, the one or more UWB tags each configured to: determine initial location data for a smart device associated with a UWB tag; monitor for movement of the smart device that is identified by the initial location data based on subsequent positioning data associated with the smart device; and communicate the initial location data for the smart device to a computing device that implements a tracking service configured to generate an object identity database, each of the one or more smart devices identified by their respective initial location data in the object identity database.

Alternatively or in addition to the above described system, any one or combination of: the smart devices are each identified in the object identity database by only the initial location data without additional device identifying information. The smart devices each include a GPS radio configured to communicate the initial location data and the subsequent positioning data to the UWB tag associated with a smart device.

The invention claimed is:

1. A system, comprising:
    ultra-wideband (UWB) tags located for association with respective objects in an environment, each UWB tag identified with a digital label indicative of the association with one or more of the objects; and
    a tracking service implemented at least partially in hardware and configured to:
        receive initial location data for the one or more objects as global positioning system (GPS) data;
        generate an object identity database, each of the one or more objects identified by their respective initial location data;
        receive subsequent positioning data for the one or more objects from each of the UWB tags that are associated with the one or more objects; and
        monitor for movement of an object based on a change of positioning of the object from an initial position indicated by the initial location data to a subsequent position indicated by the subsequent positioning data.

2. The system of claim 1, wherein the tracking service is configured to:
    determine updated location data associated with the object based on the subsequent positioning data; and
    update an identity of the object in the object identity database using the updated location data.

3. The system as recited in of claim 1, wherein the tracking service is configured to:
    receive the subsequent positioning data associated with the one or more objects as updated GPS data; and
    determine movements of the one or more objects based on the updated GPS data.

4. The system of claim 1, wherein the one or more objects are smart devices that are each identified in the object identity database by only the initial location data without additional device identifying information.

5. The system of claim 1, wherein the one or more objects are each smart devices with a GPS radio configured to communicate the initial location data to a UWB tag associated with a smart device.

6. The system of claim 1, wherein the tracking service is configured to monitor the movements of the one or more objects for a security determination as to an unauthorized relocation of at least one of the objects.

7. The system of claim 1, wherein the tracking service is configured to monitor the movements of the one or more objects for a cluster of multiple objects moving together in an unauthorized manner.

8. The system of claim 1, wherein the tracking service is configured to monitor the movements of the one or more objects for an abnormal proximity of multiple objects in the environment.

9. The system of claim 1, further comprising a mobile device configured to:
    implement the tracking service to determine movements of the one or more objects in the environment;
    implement a mapping module to generate a location association map that indicates the movements of the one or more objects in a three-dimension coordinate system of the environment; and display the location association map on a display screen of the mobile device, the location association map indicating current locations of the one or more objects in the environment.

10. The system of claim 1, further comprising a camera configured to capture images of the environment based on detecting the movement of the object.

11. A method, comprising:
establishing communicative links between a mobile device and ultra-wideband (UWB) tags located for association with respective objects in an environment;
receiving initial location data for one or more of the objects as global positioning system (GPS) data;
generating an object identity database, each of the one or more objects identified by their respective initial location data;
receiving subsequent positioning data for the one or more objects from each of the UWB tags that are associated with the one or more objects; and
monitoring for movement of an object based on a change of positioning of the object from an initial position indicated by the initial location data to a subsequent position indicated by the subsequent positioning data.

12. The method of claim 11, further comprising:
determining updated location data associated with the object based on the subsequent positioning data; and
updating an identity of the object in the object identity database using the updated location data.

13. The method of claim 11, wherein:
the subsequent positioning data associated with the one or more objects is received as updated GPS data; and
movements of the one or more objects are determined based on the updated GPS data.

14. The method of claim 11, wherein the one or more objects are smart devices that are each identified in the object identity database by only the initial location data without additional device identifying information.

15. The method of claim 11, further comprising:
monitoring the movements of the one or more objects for a security determination as to an unauthorized relocation of at least one of the objects.

16. The method of claim 11, further comprising:
monitoring the movements of the one or more objects for a cluster of multiple objects moving together in an unauthorized manner.

17. The method of claim 11, further comprising:
generating a location association map that indicates the movements of the one or more objects in a three-dimension coordinate system of the environment; and
displaying the location association map on a display screen of the mobile device, the location association map indicating current locations of the one or more objects in the environment.

18. A system, comprising:
one or more ultra-wideband (UWB) tags located for association with respective smart devices in an environment, each UWB tag identified with a digital label indicative of the association with one of the smart devices, the one or more UWB tags each configured to:
determine initial location data for a smart device based on global positioning system (GPS) data;
receive subsequent positioning data for the smart device from each of the UWB tags that are associated with the smart devices;
monitor for movement of the smart device based on a change of positioning of the smart device from an initial position indicated by the initial location data to a subsequent position indicated by the subsequent positioning data associated with the smart device; and
communicate the initial location data for the smart device to a computing device that implements a tracking service configured to generate an object identity database, each of the one or more smart devices identified by their respective initial location data in the object identity database.

19. The system of claim 18, wherein the smart devices are each identified in the object identity database by only the initial location data without additional device identifying information.

20. The system of claim 18, wherein the smart devices each include a GPS radio configured to communicate the initial location data and the subsequent positioning data to the UWB tag associated with the smart device.

* * * * *